(12) United States Patent
Murakami

(10) Patent No.: US 11,416,905 B2
(45) Date of Patent: Aug. 16, 2022

(54) INFORMATION PROCESSING DEVICE, INFORMATION PROCESSING METHOD, AND INFORMATION PROCESSING PROGRAM FOR ASSOCIATING CATEGORIES WITH ITEMS USING FEATURE POINTS OF A REFERENCE IMAGE

(71) Applicant: Rakuten Group, Inc., Tokyo (JP)

(72) Inventor: Takuya Murakami, Tokyo (JP)

(73) Assignee: Rakuten Croup. Inc., Tokyo (JP)

( * ) Notice: Subject to any disclaimer, the term of this patent is extended or adjusted under 35 U.S.C. 154(b) by 453 days.

(21) Appl. No.: 16/066,512

(22) PCT Filed: Dec. 28, 2015

(86) PCT No.: PCT/JP2015/086514
§ 371 (c)(1),
(2) Date: Jun. 27, 2018

(87) PCT Pub. No.: WO2017/115420
PCT Pub. Date: Jul. 6, 2017

(65) Prior Publication Data
US 2019/0012716 A1    Jan. 10, 2019

(51) Int. Cl.
*G06Q 30/06* (2012.01)
*G06Q 30/02* (2012.01)
(Continued)

(52) U.S. Cl.
CPC ....... *G06Q 30/0625* (2013.01); *G06F 16/532* (2019.01); *G06F 16/583* (2019.01);
(Continued)

(58) Field of Classification Search
CPC .......................... G06Q 30/06; G06Q 30/0625
(Continued)

(56) References Cited

U.S. PATENT DOCUMENTS

2013/0022275 A1   1/2013   Inoue et al.
2014/0279265 A1*  9/2014   Bhardwaj ............ G06F 16/532
                                                 705/26.63

FOREIGN PATENT DOCUMENTS

JP    2006-209260 A    8/2006
JP    2007-188440 A    7/2007
(Continued)

OTHER PUBLICATIONS

Emmanuel Turquin, "A sketchbased interface for clothing virtual characters." IEEE Computer Graphics and Applications, Institute of Electrical and Electronics Engineers, 2007, 27 (1), pp. 72-81. ff10.1109/MCG.2007.1ff. ffhal-00171414.*

(Continued)

*Primary Examiner* — Jeffrey A. Smith
*Assistant Examiner* — Jennifer V Lee
(74) *Attorney, Agent, or Firm* — Sughrue Mion, PLLC

(57) ABSTRACT

The present invention aims to provide an information processing device, an information processing method, and the like capable of reducing labor of associating an item for sale with a category. The information processing device acquires an image specified by a user. The information processing device extracts a feature value of the specified image. The information processing device acquires category information corresponding to an item for sale represented by the specified image. The information processing device searches for images similar to the specified image, based on the extracted feature value. The information processing device causes at least one of the found images to be displayed as a search result. The information processing device, when the user has selected any one image from the displayed search result, makes a storage unit store the acquired category information in association with sale item identification information corresponding to the selected image.

11 Claims, 24 Drawing Sheets

(51) Int. Cl.
*G06F 16/583* (2019.01)
*G06V 10/40* (2022.01)
*G06V 10/75* (2022.01)
*G06V 30/32* (2022.01)
*G06F 16/532* (2019.01)
*G06K 9/62* (2022.01)

(52) U.S. Cl.
CPC ....... *G06F 16/5838* (2019.01); *G06K 9/6215* (2013.01); *G06Q 30/02* (2013.01); *G06Q 30/06* (2013.01); *G06Q 30/0643* (2013.01); *G06V 10/40* (2022.01); *G06V 10/7553* (2022.01); *G06V 30/333* (2022.01); *G06V 30/36* (2022.01)

(58) Field of Classification Search
USPC ................................................ 705/26.1–27.2
See application file for complete search history.

(56) References Cited

FOREIGN PATENT DOCUMENTS

| | | | |
|---|---|---|---|
| JP | 2007-264747 | A | 10/2007 |
| JP | 2009-251850 | A | 10/2009 |
| JP | 2010-262425 | A | 11/2010 |
| JP | 2011-039944 | A | 2/2011 |
| JP | 2012-243126 | A | 12/2012 |
| JP | 5767413 | B1 | 8/2015 |
| WO | 2010-016281 | A1 | 2/2010 |

OTHER PUBLICATIONS

International Search Report of PCT/JP2015/086514 filed Feb. 23, 2016.

* cited by examiner

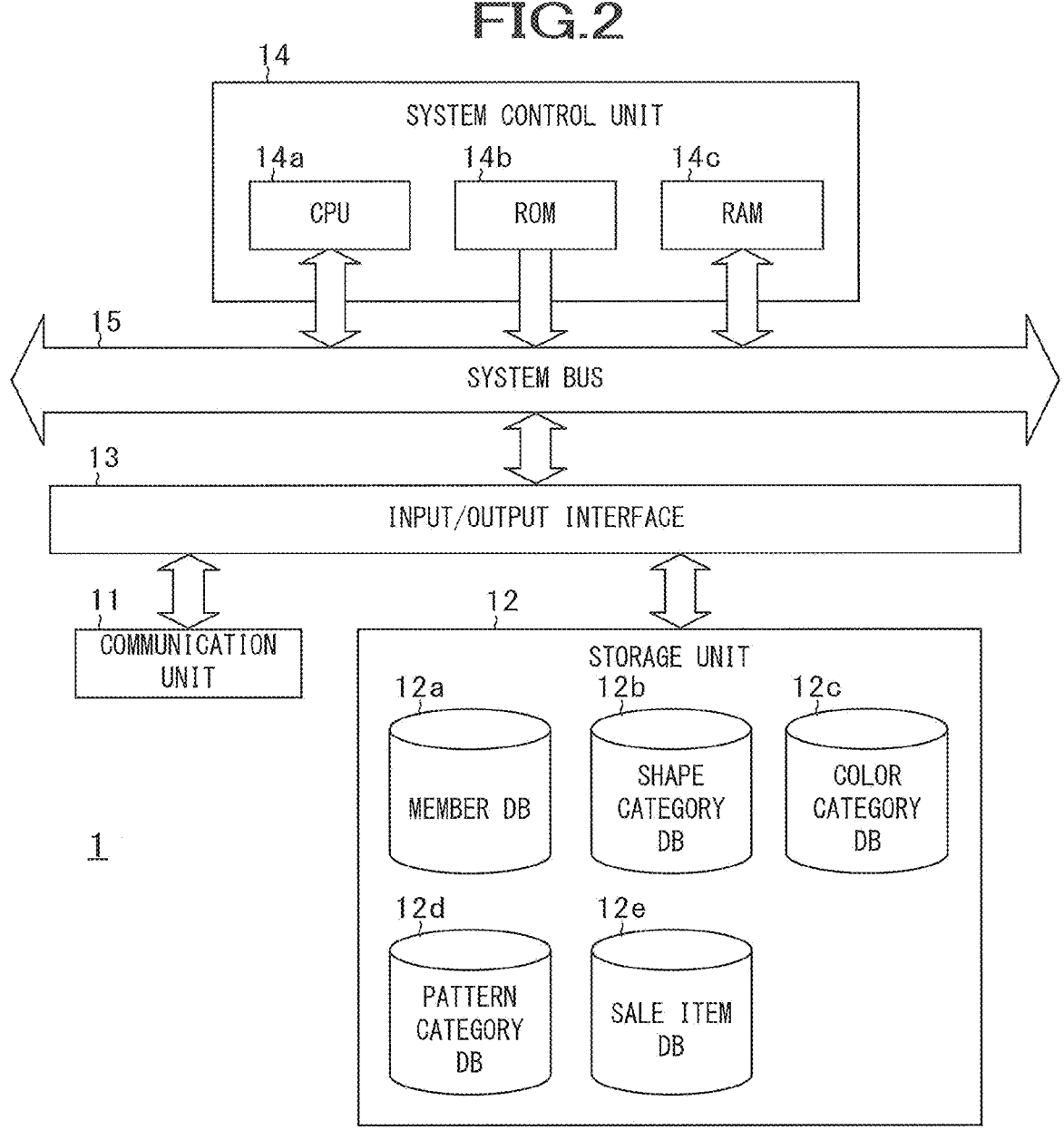

FIG.3

MEMBER DB — 12a
| USER ID |
| PASSWORD |
| NICKNAME |
| PERSONAL NAME |
| BIRTH DATE |
| GENDER |
| ZIP CODE |
| ADDRESS |
| PHONE NUMBER |
| ELECTRONIC MAIL ADDRESS |
| CREDIT CARD INFORMATION |
| . . . |

SHAPE CATEGORY DB — 12b
| CATEGORY ID |
| CATEGORY NAME (SHAPE NAME) |
| LEVEL |
| PARENT CATEGORY ID |
| CHILD CATEGORY LIST |
| BODY COVER INFORMATION |

BODY COVER INFORMATION
| BODY PART ID | FLAG |
|---|---|
| P1 | FALSE |
| P2 | FALSE |
| P3 | FALSE |
| P4 | TRUE |
| P5 | TRUE |
| . . . | . . . |
| P33 | FALSE |

COLOR CATEGORY DB — 12c
| CATEGORY ID |
| CATEGORY NAME (COLOR NAME) |

PATTERN CATEGORY DB — 12d
| CATEGORY ID |
| CATEGORY NAME (PATTERN NAME) |
| FEATURE VALUE |

SALE ITEM DB — 12e
| SHOP ID |
| SALE ITEM ID |
| SHAPE CATEGORY ID |
| COLOR CATEGORY ID |
| PATTERN CATEGORY ID |
| SALE ITEM NAME |
| SALE ITEM IMAGE |
| FEATURE VALUE OF SHAPE |
| FEATURE VALUE OF COLOR |
| FEATURE VALUE OF PATTERN |
| . . . |

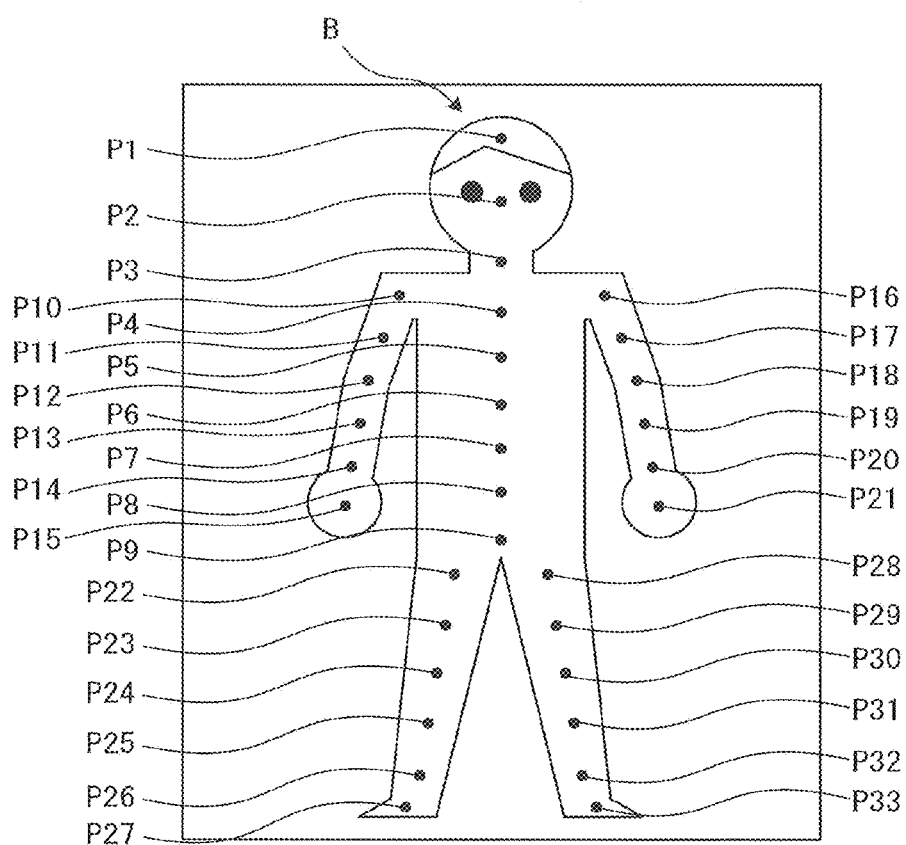

LONG-SLEEVE T-SHIRT

● TRUE
· FALSE

MINI-SKIRT

SHORT-SLEEVE DRESS

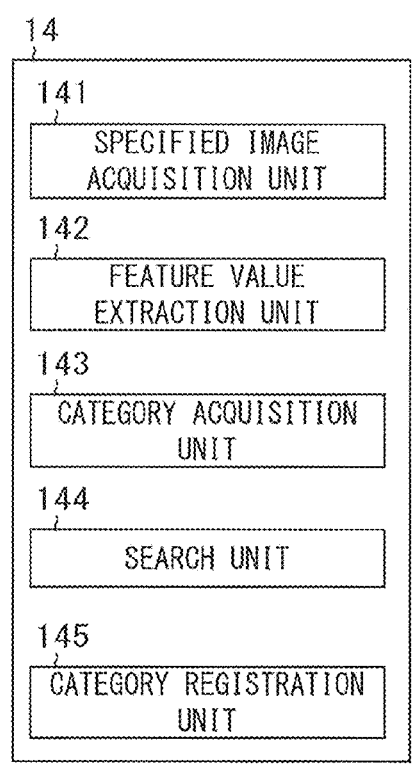

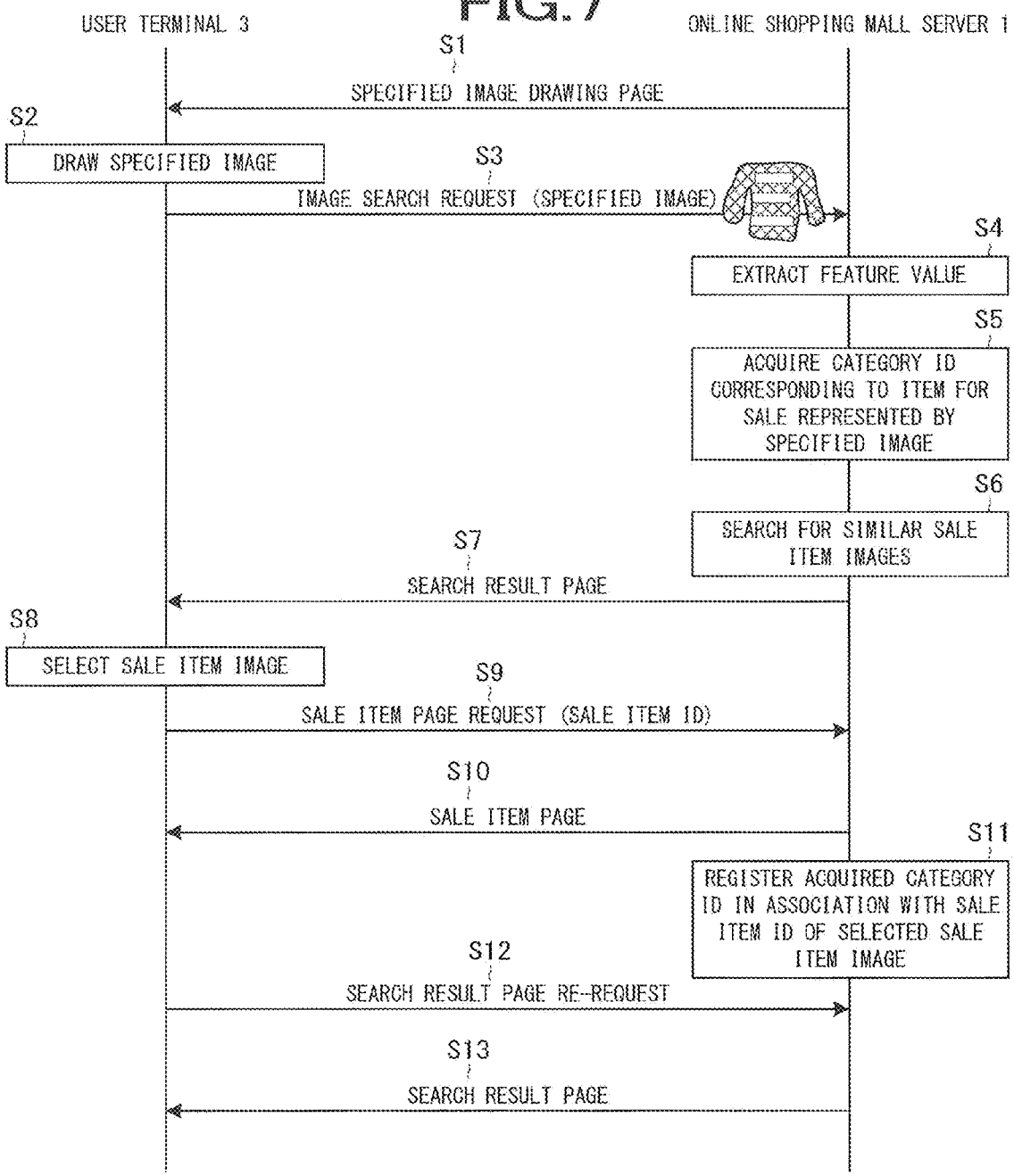

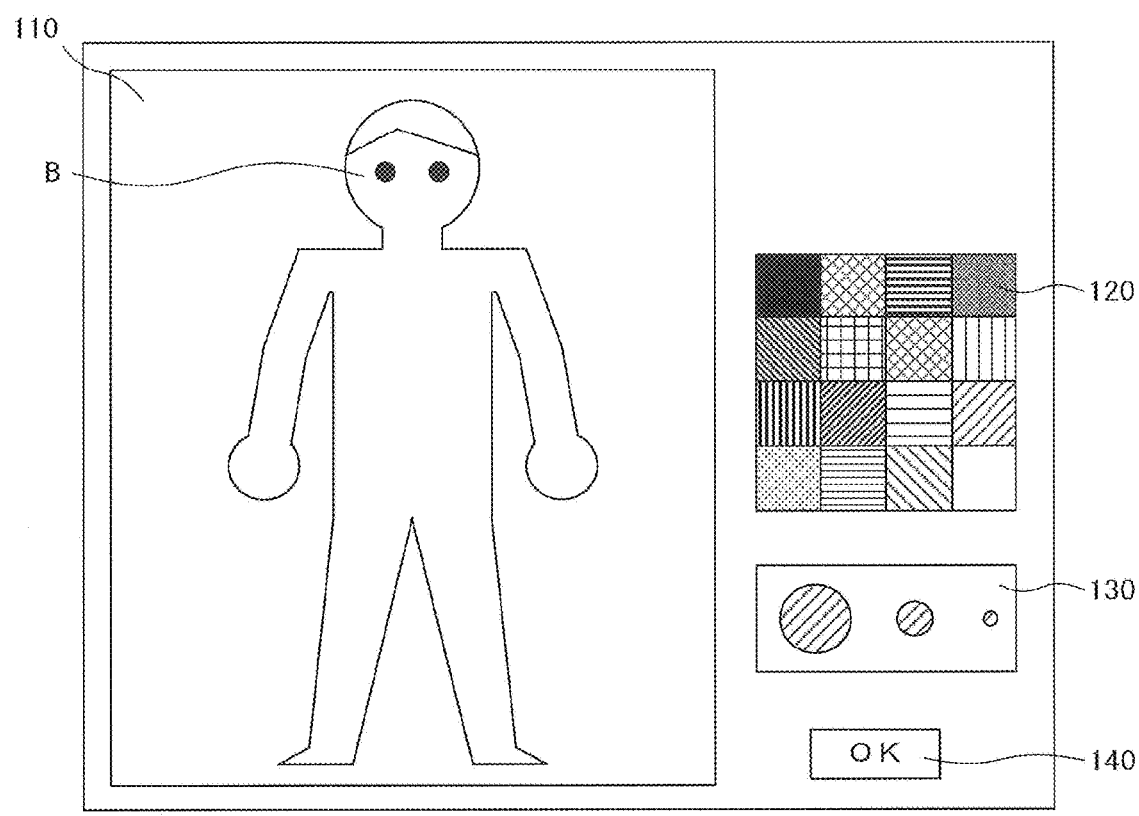

FIG.13A

SELECTED ITEM FOR SALE

CATEGORY ACQUIRED
BASED ON SPECIFIED IMAGE

| SHAPE | LONG-SLEEVE T-SHIRT |
| COLOR | RED AND WHITE |
| PATTERN | BORDER |

CATEGORY BEFORE SELECTION

| SHAPE | LONG-SLEEVE T-SHIRT |
| COLOR | RED AND WHITE |
| PATTERN | |

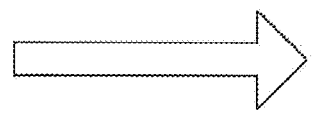

CATEGORY AFTER SELECTION

| SHAPE | LONG-SLEEVE T-SHIRT |
| COLOR | RED AND WHITE |
| PATTERN | BORDER |

FIG.13B

SELECTED ITEM FOR SALE

CATEGORY ACQUIRED
BASED ON SPECIFIED IMAGE

| SHAPE | LONG-SLEEVE T-SHIRT |
| COLOR | RED AND GRAY |
| PATTERN | BORDER |

CATEGORY BEFORE SELECTION

| SHAPE | SHORT-SLEEVE T-SHIRT |
| COLOR | RED AND WHITE |
| PATTERN | CHECK |

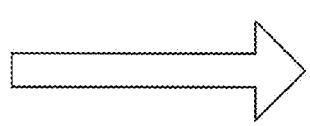

CATEGORY AFTER SELECTION

| SHAPE | LONG-SLEEVE T-SHIRT |
| COLOR | RED AND GRAY |
| PATTERN | BORDER |

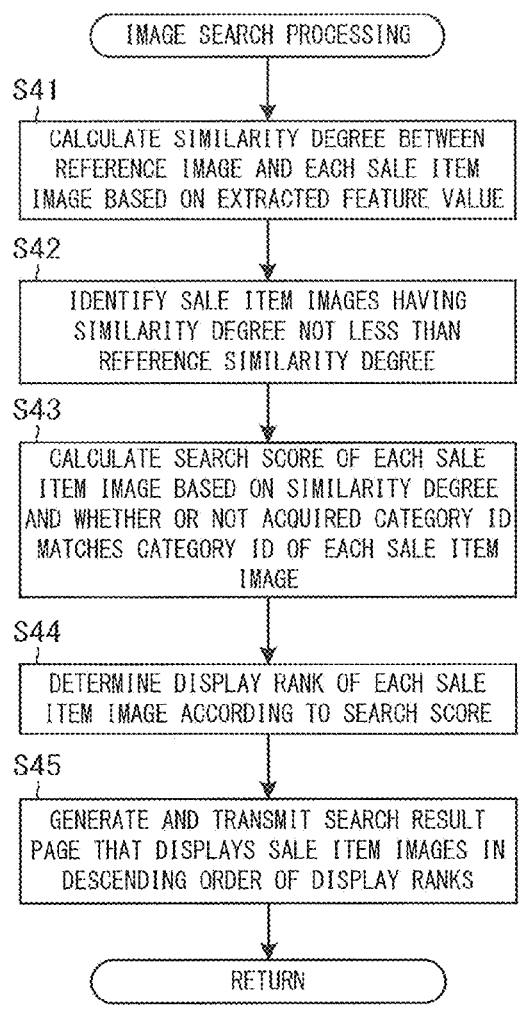

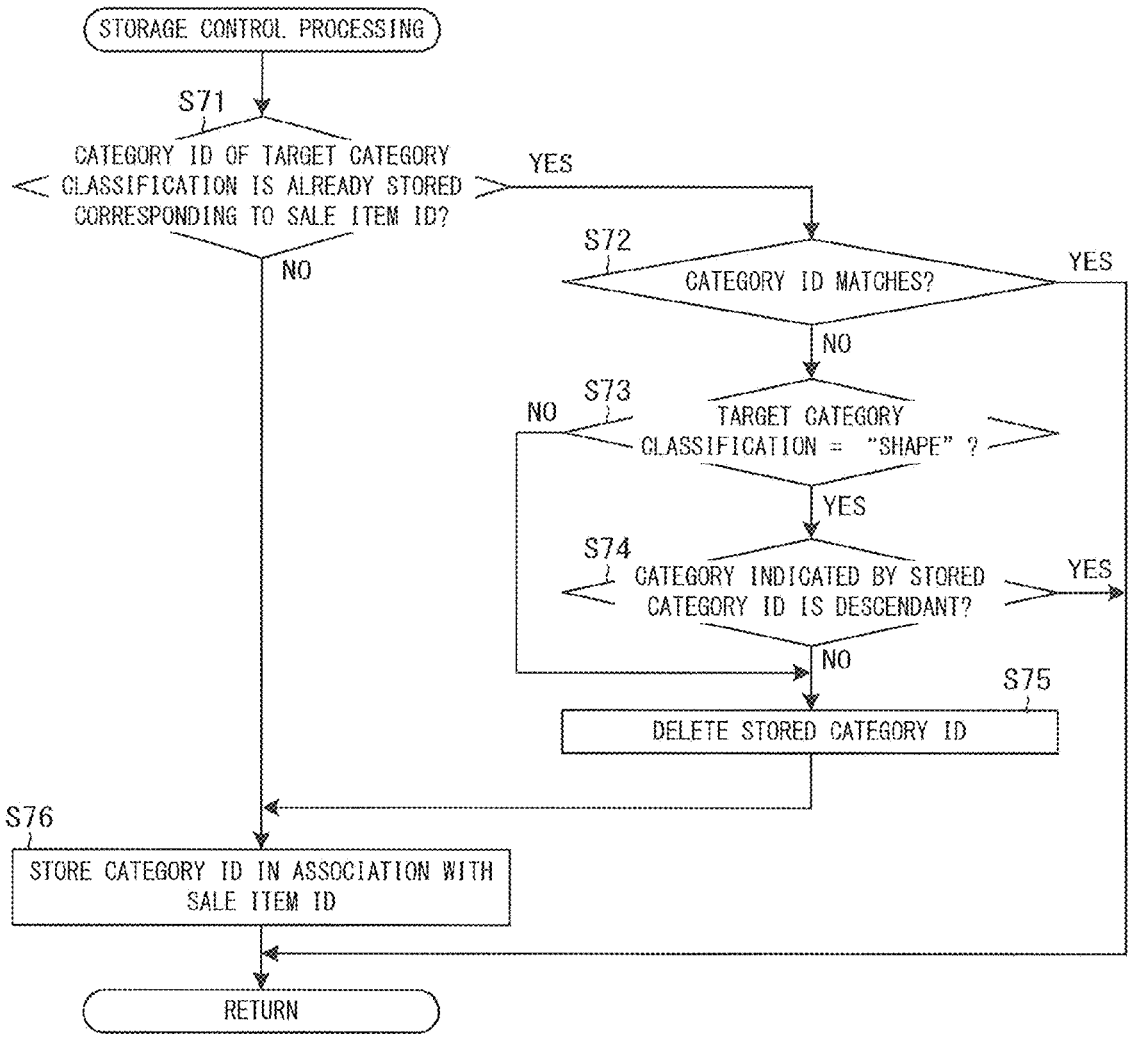

FIG.19

| MEMBER DB | 12a |
|---|---|
| USER ID | |
| PASSWORD | |
| NICKNAME | |
| PERSONAL NAME | |
| BIRTH DATE | |
| GENDER | |
| ZIP CODE | |
| ADDRESS | |
| PHONE NUMBER | |
| ELECTRONIC MAIL ADDRESS | |
| CREDIT CARD INFORMATION | |
| CORRECTION INFORMATION | |
| ... | |

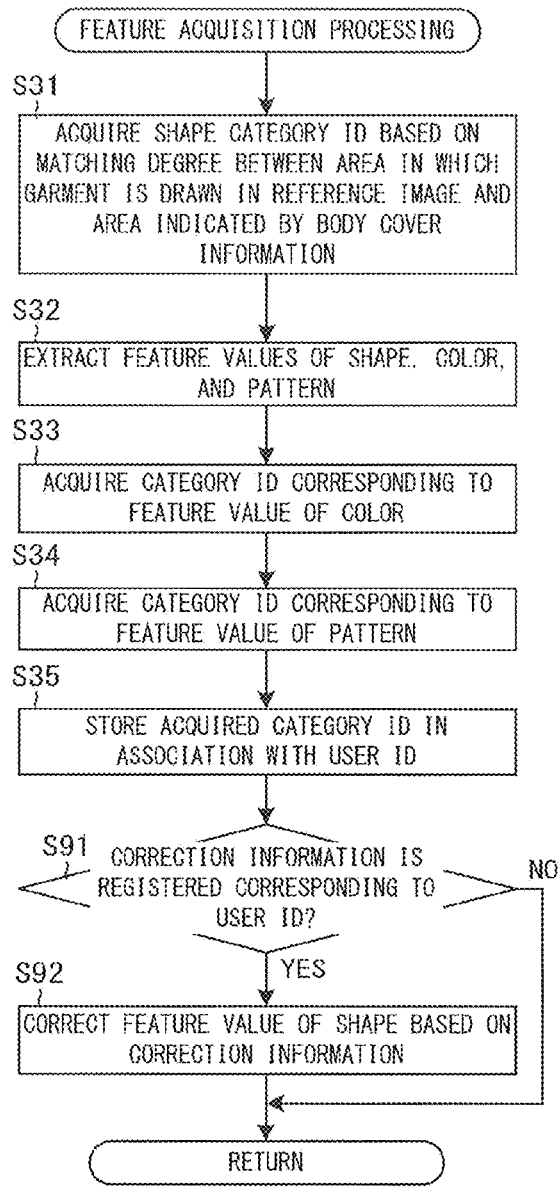

FIG.22A
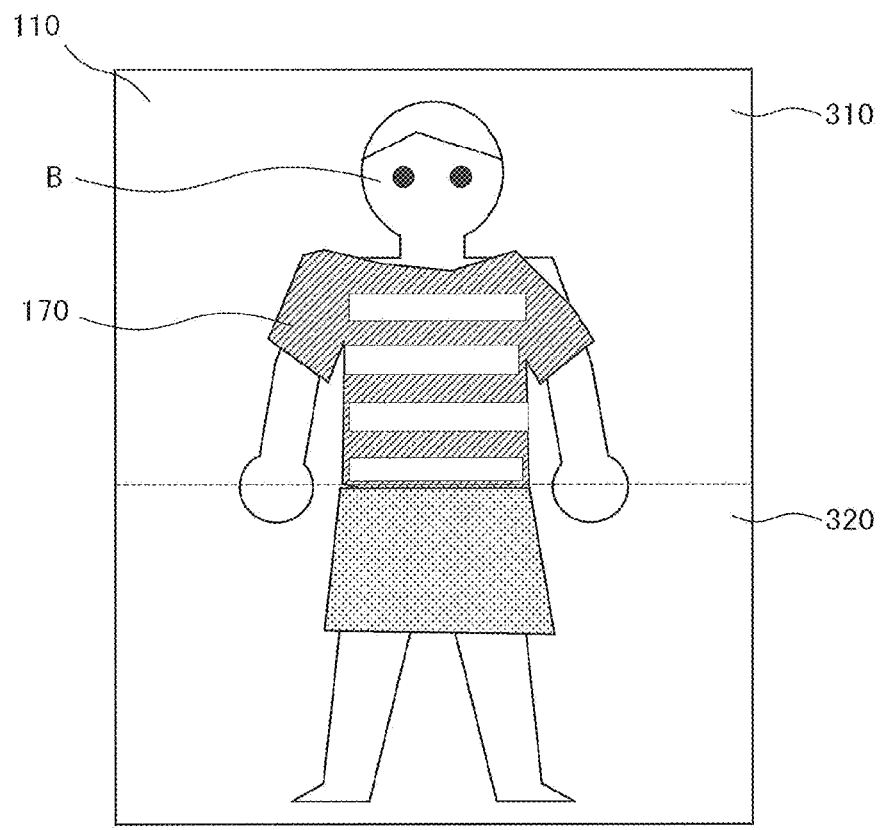
FIG.22B
ENTIRE BODY
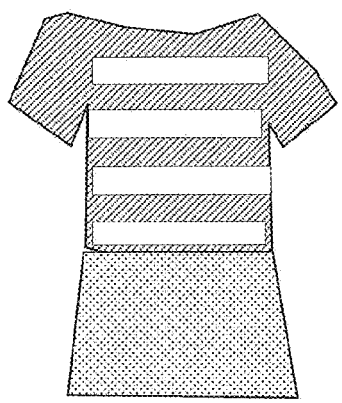
UPPER BODY
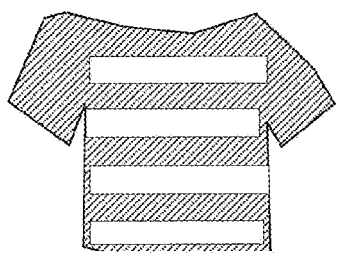
LOWER BODY
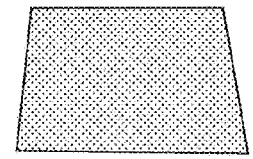

INFORMATION PROCESSING DEVICE, INFORMATION PROCESSING METHOD, AND INFORMATION PROCESSING PROGRAM FOR ASSOCIATING CATEGORIES WITH ITEMS USING FEATURE POINTS OF A REFERENCE IMAGE

CROSS REFERENCE TO RELATED APPLICATION

This application is a National Stage of International Application No. PCT/JP 2015/086514 filed Dec. 28, 2015.

TECHNICAL FIELD

The present invention relates to a technical field of systems that associate categories with items for sale.

BACKGROUND ART

Conventionally, there has been known a system that searches for items for sale traded in electronic commerce or the like, based on conditions specified by a user. In such a system, in order to facilitate a user to find a desired item for sale, there is a case in which a category is preliminarily associated with each item for sale. For example, in Patent Literature 1, there is disclosed a system which has a plurality of search databases corresponding to a plurality of categories, and when having received a term representing a category of an item for sale and a feature of the item for sale from a client device, selects a search database corresponding to the category, searches for specification information corresponding to the received term from the selected search database, and searches for an item for sale corresponding to the specification information.

CITATION LIST

Patent Literature

Patent Literature 1: JP 2007-264747 A

SUMMARY OF INVENTION

Technical Problem

However, in such a system as disclosed in Patent Literature 1, a seller who sells an item for sale, needs to associate a category with the item for sale for each item for sale by himself/herself. Therefore, in a case where a seller deals a plurality of items for sale, it is a troublesome work for the seller to associate a category with each of the items for sale.

The present invention was made in view of the above points and aims to provide an information processing device, an information processing method, and the like capable of reducing labor of associating an item for sale with a category.

Solution to Problem

To solve the above problems, the invention according to includes: an image acquisition means that acquires an image specified by a user; an extraction means that extracts a feature value of the specified image; a category information acquisition means that acquires category information indicating a category corresponding to an item for sale represented by the specified image among a plurality of categories for classifying items for sale; a search means that searches for images similar to the specified image, based on the extracted feature value, from a storage means that stores, for each item for sale, sale item identification information for identifying an item for sale and an image representing the item for sale in association with each other; a display control means that causes at least one of the found images to be displayed as a search result; and a storage control means that, when the user has selected any one image from the displayed search result, stores the acquired category information in the storage means in association with sale item identification information corresponding to the selected image.

According to the invention, the information processing device searches for images similar to the specified image, based on the feature value of the image specified by the user. At least one of the found images is displayed. The item for sale represented by the image similar to the specified image may belong to the same category as the category to which the item for sale represented by the specified image belongs. The reason is that the category to which an item for sale represented by the specified image belongs may be related to a feature of the item for sale, and the feature of the specified image may represent a feature about an appearance of the item for sale. When the user has selected any one image from among at least one displayed image, the information processing device stores category information indicating a category corresponding to an item for sale represented by the specified image in the storage means in association with sale item identification information corresponding to the selected image. The item for sale represented by an image selected from among images similar to the specified image is highly likely to belong to the same category as the category to which the item for sale represented by the specified image belongs. The reason is that the user is highly likely to select an image representing the item for sale having the same feature as the feature of appearance of the item for sale represented by the image specified by the user. Therefore, according to the selection by the user, an appropriate category is automatically associated with the selected item for sale. Thus, the labor of associating an item for sale with a category can be reduced.

The invention according to is characterized in that in the information processing device according to, the display control means, when causing the search result to be re-displayed after the user selects any one image from the displayed search result, causes an image, among the found images, similar to the selected image to be preferentially displayed based on a feature value of the selected image.

The user is likely to further desire an item for sale which has an identical or similar feature of appearance of an item for sale represented by the selected image. According to the invention, the information processing device causes an image similar to the selected image among images similar to the specified image to be preferentially displayed. Thus, the information processing device can cause an image representing an item for sale that the user is particularly likely to desire, among images similar to the specified image, to be preferentially displayed.

The invention according to is characterized in that in the information processing device, the image acquisition means acquires an image drawn by the user as the specified image, wherein the information processing device further comprises: a second storage control means that, when there is a difference which satisfies a predetermined condition between a feature value of the drawn image and a feature value of the selected image, stores correction information indicating contents of correction for reducing the difference in a correction information storage means in association with user identification information for identifying the user; and a correction means that, when a feature value of a newly drawn image is extracted by the extraction means, corrects the extracted feature value by contents indicated by correction information corresponding to user identification information for identifying a user who has drawn the new image, and wherein the search means searches for images similar to the new image, based on the corrected feature value.

When there is a difference which satisfies a predetermined condition between a feature of the image drawn by the user and a feature of the image selected by the user, the user may not sufficiently draw the feature of the item for sale that the user actually desires. The difference may be caused by a habit or predisposition of the user in the way of drawing an image. When the user has drawn an image newly, too, the feature of the image is affected by the habit or predisposition of the user. According to the invention, the information processing device corrects a feature value of the image drawn newly by the user, based on correction information for reducing the difference between a feature value of the image drawn by the user and a feature value of the image selected by the user. Thus, the information processing device can correct the feature value so that the feature indicated by the feature value of the image newly drawn is close to the feature of the item for sale that the user actually desires. Accordingly, even if the user cannot draw an image sufficiently representing a feature of a desired item for sale due to the habit or predisposition, the user can search for an item for sale having a feature that the user desires.

The invention according to further includes, in the information processing device according to, a body image display control means that causes an image representing a body to be displayed, wherein the image acquisition means acquires an image drawn by the user on the displayed image as the specified image, and the category information acquisition means, based on which part of the body represented by the displayed image a garment represented by the drawn image covers, acquires category information indicating a category corresponding to the garment represented by the drawn image among a plurality of categories for classifying shapes of garments.

According to the invention, the user draws an image representing a garment on an image representing a body. The information processing device, based on which part of the body represented by the displayed image a garment represented by the drawn image covers, acquires, in a shape, category information indicating a category corresponding to a garment represented by the drawn image. Since the shape of a garment relates to which part of the body the garment covers, the information processing device can associate a category indicating an appropriate shape with the selected item for sale.

The invention according to is characterized in that in the information processing device according to, the storage means, for at least one item for sale, stores category information indicating a category assigned to an item for sale in association with an image representing the item for sale and sale item identification information for identifying the item for sale, and the display control means, among images similar to the specified image, causes an image corresponding to category information that matches the acquired category information to be preferentially displayed.

According to the invention, the information processing device refers to the category information stored in the storage means, and causes, among images similar to the specified image, an image of an item for sale corresponding to the same category as the category corresponding to the item for sale represented by the specified image to be preferentially displayed. Thus, the information processing device can cause an image representing an item for sale that the user is particularly likely to desire, among images similar to the specified image, to be preferentially displayed.

The invention according to is characterized in that in the information processing device according to, the storage means, for at least one item for sale, stores category information indicating a category assigned to an item for sale in association with an image representing the item for sale and sale item identification information for identifying the item for sale, the category information acquisition means, for at least one classification among a plurality of classifications to each of which a plurality of categories belong, acquires category information indicating a category corresponding to an item for sale represented by the specified image among a plurality of categories belonging to the classification, and the storage control means, when category information indicating a category belonging to the same classification as a classification to which a category indicated by the acquired category information belongs is not stored in the storage means in association with the selected image, stores the acquired category information in the storage means.

According to the invention, when category information indicating a category belonging to the same classification as a classification in which a category is not yet associated with an item for sale represented by the selected image is acquired in association with an item for sale represented by the specified image, the information processing device stores the acquired category information in the storage means. Accordingly, when, for at least one classification among a plurality of classifications, a category is not associated with an item for sale, the information processing device can automatically associate a category of the classification with an item for sale.

The invention according to is characterized in that in the information processing device according to, the storage means, for at least one item for sale, stores category information indicating a category assigned to an item for sale in association with an image representing the item for sale and sale item identification information for identifying the item for sale, and the storage control means, when category information indicating a category incompatible with a category indicated by the acquired category information has been already stored in the storage means in association with the selected image, changes category information to be stored in the storage means from the already stored category information to the acquired category information.

If an item for sale represented by the selected image is assumed to belong to both of mutually exclusive two categories, a contradiction arises. In this case, a category already associated with an item for sale represented by the selected image is likely to be an erroneous category. According to the invention, when a category corresponding to an item for sale represented by a specified image and a category already associated with an item for sale represented by the selected image are mutually exclusive, the information processing device changes a category to be associated with the selected item for sale to a category corresponding to an item for sale represented by the specified image. Accordingly, the information processing device can correct a category erroneously associated with an item for sale.

The invention according to further includes, in the information processing device according to, a determination means that determines whether or not the specified image may represent a plurality of items for sale, wherein the extraction means extracts a feature value of the image on the assumption that the specified image represents one item for sale, and when it is determined that the specified image may represent a plurality of items for sale, further extracts a feature value of an image part, in the specified image, representing an item for sale for each of the plurality of items for sale, and the search means, based on a feature value of the specified image, searches for images similar to the specified image, and when it is determined that the specified image may represent a plurality of items for sale, further for each image part representing an item for sale, searches for images similar to the image part, based on a feature value of the image part.

According to the invention, the information processing device, on the assumption that the specified image represents one item for sale, searches for images similar to the image. When the specified image may represent a plurality of items for sale, the information processing device further searches for images similar to an image part representing an item for sale for each of the plurality of items for sale. Accordingly, even if the user has drawn an image representing a plurality of items for sale, the information processing device can search for images representing items for sale that the user is highly likely to desire.

The invention according to, in an information processing method executed by a computer, includes: an image acquisition step of acquiring an image specified by a user; an extraction step of extracting a feature value of the specified image; a category information acquisition step of acquiring category information indicating a category corresponding to an item for sale represented by the specified image among a plurality of categories for classifying items for sale; a search step of searching for images similar to the specified image, based on the extracted feature value from a storage means that stores, for each item for sale, sale item identification information for identifying an item for sale and an image representing the item for sale in association with each other; a display control step of causing at least one of the found images to be displayed as a search result; and a storage control step of, when the user has selected any one image from the displayed search result, storing the acquired category information in the storage means in association with sale item identification information corresponding to the selected image.

The invention according to causes a computer to function as: an image acquisition means that acquires an image specified by a user; an extraction means that extracts a feature value of the specified image; a category information acquisition means that acquires category information indicating a category corresponding to an item for sale represented by the specified image among a plurality of categories for classifying items for sale; a search means that searches for images similar to the specified image, based on the extracted feature value, from a storage means that stores, for each item for sale, sale item identification information for identifying an item for sale and an image representing the item for sale in association with each other; a display control means that causes at least one of the found images to be displayed as a search result; and a storage control means that, when the user has selected any one image from the displayed search result, stores the acquired category information in the storage means in association with sale item identification information corresponding to the selected image.

Advantageous Effects of Invention

According to the invention, according to the selection by the user, an appropriate category is automatically associated with the selected item for sale. Thus, the labor of associating an item for sale with a category can be reduced.

BRIEF DESCRIPTION OF DRAWINGS

FIG. 2 is a block diagram that illustrates one example of a schematic configuration of an online shopping mall server 1 according to one embodiment.

FIG. 3 is a diagram that illustrates one example of contents stored in databases.

FIG. 4 is a diagram that illustrates an example of body parts.

FIG. 6 is a diagram that illustrates one example of a function block of a system control unit 14 of the online shopping mall server 1 according to one embodiment.

FIG. 7 is a sequence chart that illustrates one example of an outline of processing of the information processing system S according to one embodiment.

FIG. 8 is a diagram that illustrates one example of a specified image drawing page.

FIG. 13A illustrates an example of registration of a category ID.

FIG. 13B illustrates an example of registration of a category ID.

FIG. 15 is a flowchart that illustrates one example of image search processing of the system control unit 14 of the online shopping mall server 1 according to one embodiment.

FIG. 17 is a flowchart that illustrates one example of storage control processing of the system control unit 14 of the online shopping mall server 1 according to one embodiment.

FIG. 19 is a diagram that illustrates one example of contents stored in a member DB 12a.

FIG. 21 is a flowchart that illustrates one example of the feature acquisition processing of the system control unit 14 of the online shopping mall server 1 according to one embodiment.

FIG. 22A is one example of a specified image drawn in a drawing area 110 of a specified image drawing page.

FIG. 22B is a diagram that illustrates an example of identifying items for sale which the specified image may represent.

DESCRIPTION OF EMBODIMENTS

Embodiments of the present invention will be described below in detail with reference to drawings. Note that, embodiments described below are embodiments in a case where the present invention is applied to an information processing system.

1. First Embodiment

[1-1. Configuration and Function Summary of Information Processing System]

Figure 1:
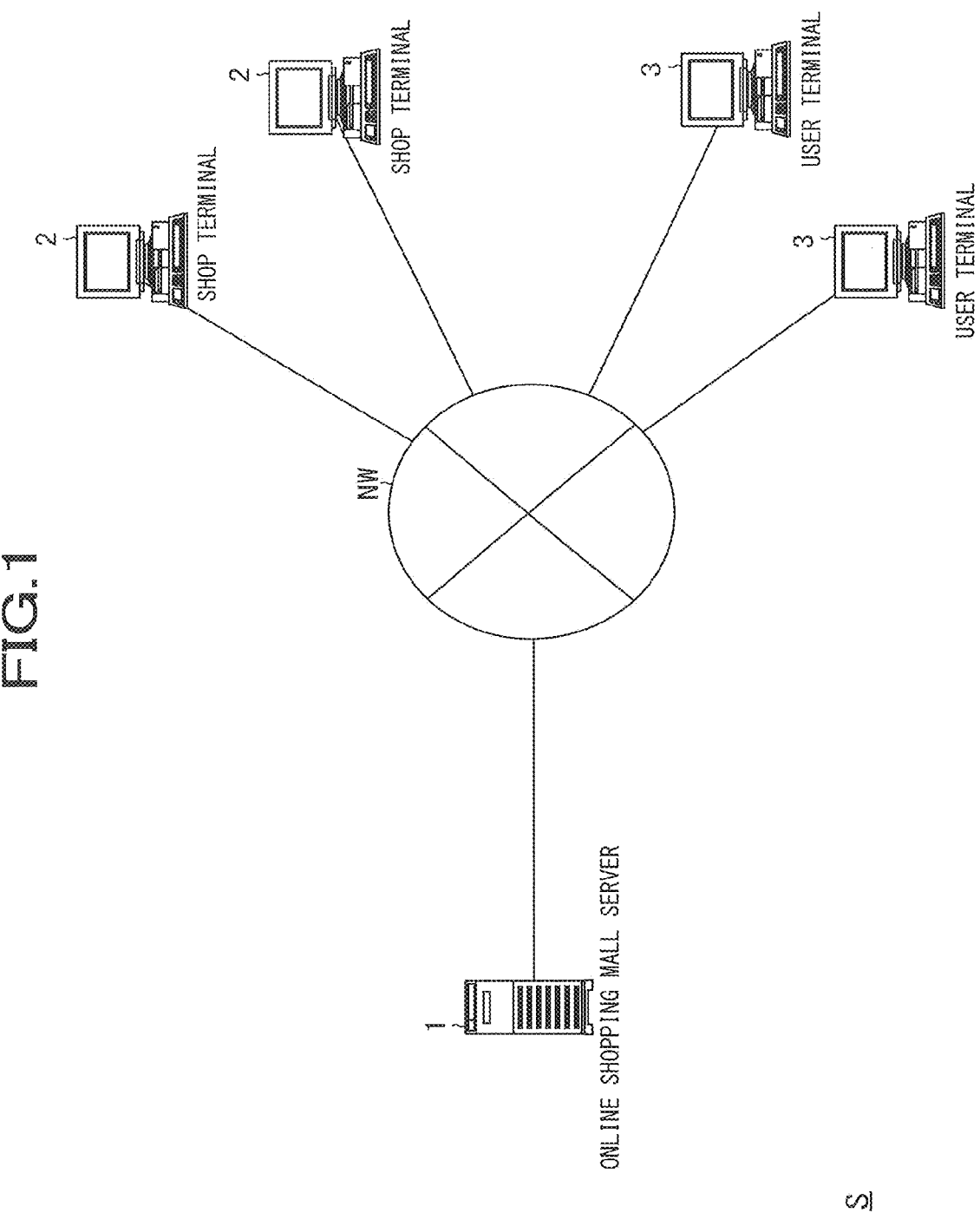
FIG. 1 is a diagram that illustrates one example of a schematic configuration of an information processing system S according to one embodiment.

First, the configuration and function summary of an information processing system S according to the present embodiment will be described with reference to FIG. 1. FIG. 1 is a diagram that illustrates one example of a schematic configuration of the information processing system S according to the present embodiment.

As shown in FIG. 1, the information processing system S includes an online shopping mall server 1, a plurality of shop terminals 2, and a plurality of user terminals 3. Then, the online shopping mall server 1, the shop terminals 2, and the user terminals 3 can mutually transmit and receive data using a communication protocol, such as TCP/IP, via a network NW. Note that, the network NW includes, for example, the Internet, a dedicated communication line (for example, CATV (Community Antenna Television) line), a mobile communication network (including a base station and the like), a gateway, and the like.

The online shopping mall server 1 is a server device that executes various processing for an online shopping mall allowing purchase of items for sale. Users, who use the online shopping mall, can purchase a desired item for sale from a desired shop in the online shopping mall. In the present embodiment, garments are sold in the online shopping mall. However, the claimed invention can be applied to any item for sale. Further, a website to which the present invention can be applied is not limited to the online shopping mall. For example, the present invention may be applied to a website of electronic commerce in which items for sale are sold from a single selling source.

The online shopping mall server 1 is one example of an information processing device in the present invention. The online shopping mall server 1, for example, transmits a web page of the online shopping mall and performs processing regarding search, order, and the like of items for sale, in response to requests from the shop terminals 2 and the user terminals 3. A user, when searching for an item for sale, can specify a search condition. The search condition includes, for example, a keyword, a category of an item for sale, and the like. The online shopping mall server 1 searches for an item for sale that meets the search condition specified by the user. In addition, the user can specify an image that corresponds to the search condition. An image specified as the search condition is referred to as a specified image. The online shopping mall server 1 searches for sale item images similar to the specified image. Searching for sale item images similar to the specified image is also searching, based on an image, for items for sale having a feature identical or similar to a feature in appearance of an item for sale represented by the specified image. For example, the online shopping mall server 1 searches for sale item images having a feature similar to the feature of the specified image. The feature of image is, for example, a feature of a shape, color, or pattern of an item for sale represented in an image.

The shop terminal 2 is a terminal device that is used by an employee and the like of a shop located in the online shopping mall. The shop terminal 2 accesses a server device, such as the online shopping mall server 1, based on an operation from the employee or the like. Then, the shop terminal 2 receives a web page from the server device and displays it. The shop terminal 2 incorporates software, such as a browser and an electronic mail client. The employee, by using the shop terminal 2, for example, registers information of an item for sale with the online shopping mall, and checks order contents of an item for sale. The employee can register a category as one piece of information of an item for sale. However, in a case where a shop deals in a plurality of items for sale, it is troublesome for the employee to associate categories with all items for sale. Thus, the online shopping mall server 1 acquires a category corresponding to an item for sale represented by an image specified by a user. The system control unit 14 associates the acquired category with a sale item image selected by the user from among sale item images found as images similar to the specified image. Thus, even though the employee does not perform a work for associating a category, it is possible to automatically associate a category with an item for sale.

The user terminal 3 is a terminal device of a user who purchases an item for sale from the online shopping mall. The user terminal 3 accesses the online shopping mall server 1, based on the operation from the user, and thereby receives the web page from the online shopping mall server 1 and displays it. The user operates the user terminal 3 and specifies an image for searching for a desired item for sale. For example, the user can draw a specified image representing a desired item for sale. The user terminal 3 incorporates software, such as a browser and an electronic mail client. As the user terminal 3, for example, a personal computer, PDA (Personal Digital Assistant), a portable information terminal, such as a smartphone, a mobile phone, or the like is used.

[1-2. Configuration of Online Shopping Mall Server]

Next, a configuration of the online shopping mall server 1 will be described with reference to FIGS. 2 to 5C. FIG. 2 is a block diagram that illustrates one example of a schematic configuration of the online shopping mall server 1 according to the present embodiment. As shown in FIG. 2, the online shopping mall server 1 includes a communication unit 11, a storage unit 12, an input/output interface 13, and the system control unit 14. Then, the system control unit 14 is connected with the input/output interface 13 via a system bus 15.

The communication unit 11 is connected to the network NW and controls a communication state with the shop terminal 2, the user terminal 3, and the like.

The storage unit 12 includes, for example, a hard disc drive or the like. The storage unit 12 is an example of a storage means and a correction information storage means in the present invention. In the storage unit 12, databases, such as a member DB 12a, a shape category DB 12b, a color category DB 12c, a pattern category DB 12d a sale item DB 12e, and the like, are configured. "DB" is an abbreviation of database.

FIG. 3 is a diagram that illustrates one example of contents stored in databases. The member DB 12a stores member information about a user who is registered in the online shopping mall as a member. Specifically, the member DB 12a stores user attributes, such as a user ID, a password, a nickname, personal name, birth date, gender, zip code, address, phone number, electronic mail address, and credit card information, for each user in association with each other.

Each of the shape category DB 12b, the color category DB 12c, and the pattern category DB 12d stores information about a category of an item for sale. As categories in the present embodiment, three classifications or three types of categories of shape, color, and pattern exist. The classification of category is also referred to as a category classification. In the present embodiment, these databases define categories used in common for the entire online shopping mall. However, the category may be defined for each shop.

The shape category DB 12b stores shape category information about a category for classifying shapes of garments. Specifically, the shape category DB 12b stores, as shape category information, category attributes, such as a category ID, a category name, a category level, a parent category ID, a child category ID list, and body cover information for each category about a shape in association with each other. The shape category information is set, for example, by an administrator of the online shopping mall.

The categories about a shape may be defined hierarchically in a tree structure. Specifically, each node of the tree structure corresponds to a category. The depth of a node corresponds to a level (layer) of a category corresponding to the node. The depth of a node is a distance from a node located at a root (hereinafter, referred to as a "root node"). The larger the value of the level, the deeper the depth of the node, and the smaller the value of the level, the shallower the depth of the node. A category corresponding to a child node of the root node is a category of a level 1. The category of a level 1 is the highest category. With respect to each category of the level 1, a category corresponding to the child node is defined as a category of a level 2. Here, a category J2 corresponding to a child node of a certain category J1 is called a "child category" of the category J1. In addition, the category J1 at this time is called a "parent category" of the category J2. The child category is in a range to which similar items for sale belong when the parent category is further classified into a plurality of categories. Accordingly, the child category belongs to the parent category. A category corresponding to an ancestor node of a certain node is called an "ancestor category". For example, it is assumed that a category J3 is a child category of the category J2. In this case, the categories J1 and J2 are ancestor categories of the category J3, respectively. Items for sale of the category J3 belong to the category J3 and also belong to the ancestor category of the category J3. Thus, the items for sale of the category J3 belong to any of the categories J1 to J3. A category corresponding to a descendant node of a certain category is referred to as a "descendant category". The categories J2 and J3 are descendant categories of the category J1.

The categories of the level 1 include, for example, a lady's fashion, a men's fashion, and the like. The child categories of the lady's fashion include, for example, tops, bottoms, dresses, outers, and the like. The child categories of the tops include, for example, a T-shirts, a polo shirts, cut and sew, and the like. The child categories of the T-shirts include, for example, short-sleeve T-shirts, long-sleeve T-shirts, three-quarter sleeve T-shirts, and the like. The child categories of the bottoms include, for example, skirts, pants, jeans, and the like. The child categories of the skirts include, for example, mini-skirts, knee-length skirts, long-skirts, and the like.

The category ID is identification information of a category of interest. The category name is a shape name, such as a "tops" or a "dress". The parent category ID is a category ID of a parent category of the category of interest. The child category ID list is a list of category IDs of child categories of the category of interest. The child category ID list is set in a case where the category of interest has child categories.

The body cover information is information indicating an area, on a human body, that a garment of a shape indicated by the category of interest covers. The body cover information stores, for each body part, a body part ID and a cover flag in association with each other. The body part ID is identification information of a body part. The cover flag indicates whether or not the body part indicated by the body part ID is covered with a garment. In a case where it is covered with the garment, the cover flag is set to TRUE, and in a case where it is not covered with the garment, the cover flag is set to FALSE.

FIG. 4 is a diagram that illustrates an example of body parts. As shown in FIG. 4, the locations of body parts P1 to P33 are defined on a body image B. The body image B is an image representing a human body. When an image of an item for sale is searched for, the body image B is displayed on a display of the user terminal 3. The user can draw a specified image representing a desired garment on the body image B. The body parts include, for example, a head part P1, a face P2, a throat P3, body parts P4 to P9 from the upper part to the lower part of a trunk, body parts P10 to P15 from a left shoulder to a left hand, body parts P16 to P21 from a right shoulder to a right hand, body parts P22 to P27 from a groin of a left thigh to a heel, and body parts P28 to P33 from a groin of a right thigh to a heel. In the present embodiment, cover flags are set to the body parts P1 to P33. However, cover flags may be set to body parts other than the body parts P1 to P33. An administrator of the information processing system S may freely determine to which body part a cover flag is set.

Figure 5A:
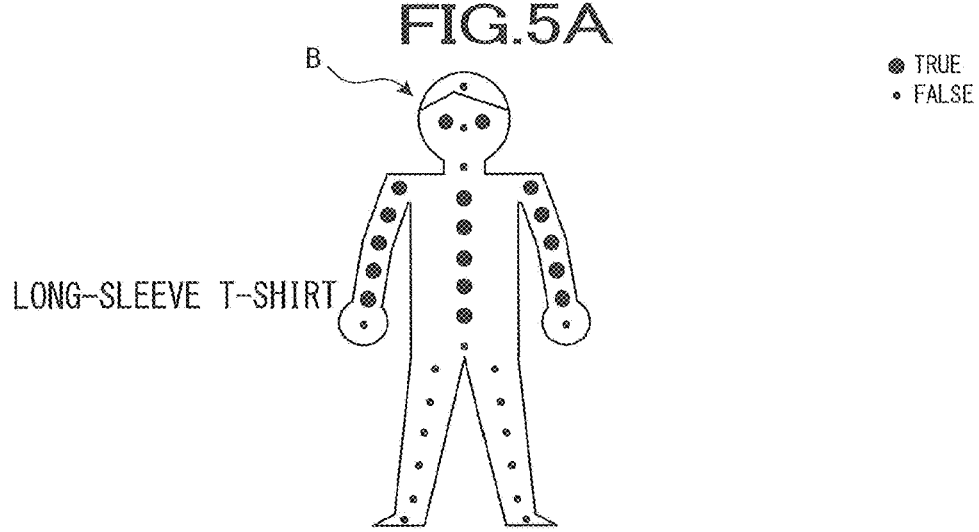
FIG. 5A is a diagram that illustrates an example of body parts which a long-sleeve T-shirt covers.

FIG. 5A is a diagram that illustrates an example of body parts which a long-sleeve T-shirt covers. The long-sleeve T-shirt covers the upper part P4 of the trunk to a lower stomach part P8, a left shoulder p10 to an ankle P14, and a right shoulder P16 to an ankle P20. Accordingly, the cover flags corresponding to the respective body parts P4 to P8, P10 to P14, and P16 to P20 are TRUE. The cover flags corresponding to the respective body parts P1 to P3, P9, P15, and P21 to P33 are FALSE.

Figure 5B:
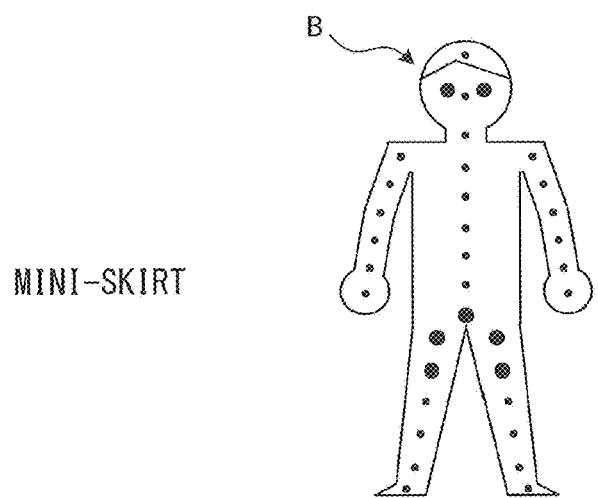
FIG. 5B is a diagram that illustrates an example of body parts which a mini-skirt covers.

FIG. 5B is a diagram that illustrates an example of body parts which a mini-skirt covers. The mini-skirt covers a trunk lower part P9, a groin P22 of a left thigh, the left thigh P23, a groin P28 of a right thigh, and a right thigh P29.

Figure 5C:
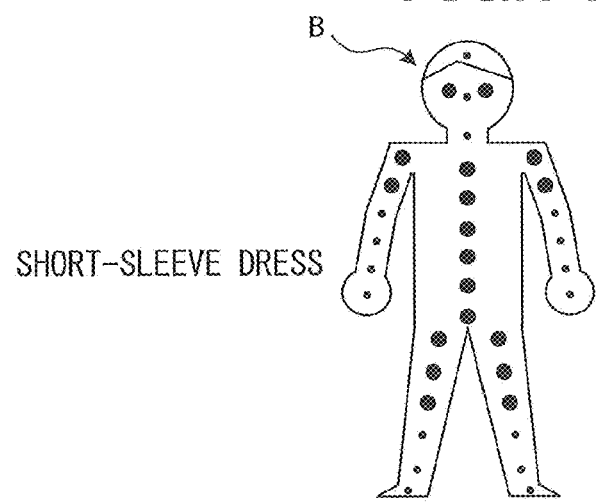
FIG. 5C is a diagram that illustrates an example of body parts which a short-sleeve dress covers.

FIG. 5C is a diagram that illustrates an example of body parts which a short-sleeve dress covers. The short-sleeve dress covers the upper part P4 to lower part P9 of the trunk, a left shoulder p10, a left upper-arm p11, a right shoulder P16, a right upper-arm P17, a groin P22 of a left thigh to a knee P24, and a groin P28 of a right thigh to a knee P30.

The color category DB 12c stores color category information about a category for classifying colors of garments. Specifically, the color category DB 12c stores, as the color category information, for each color category, a category ID and a category name in association with each other. The color category information is set, for example, by the administrator of the online shopping mall. The category ID is identification information of a category of interest. The category name is a color name, such as "red", "blue", or "green". The color indicated by the color name may be, for example, a typical color or a dominant color of a garment. The typical color or dominant color of the garment may be, for example, a plurality of colors. For example, in a case where the main colors of the garment are red and blue, the category name may be "red and blue".

The pattern category DB 12d stores pattern category information about a category for classifying patterns. Specifically, the pattern category DB 12d stores, as the pattern category information, for each pattern category, a category ID, a category name, and a pattern feature value in association with each other. The pattern category information is set, for example, by the administrator of the online shopping mall. The category ID is identification information of a category of interest. The category name is a pattern name, such as "solid", "check", "stripe", "border", or "polka-dot". The pattern indicated by the color name may be, for example, a typical pattern or a dominant pattern of a garment. The pattern feature value is, in an image, information indicating a feature of a pattern indicated by a category of interest. For example, a typical image representing a pattern is analyzed, and thereby the feature value is extracted from the image.

The sale item DB 12e stores sale item information about an item for sale sold in the online shopping mall. The sale item information includes information registered by the shop. Specifically, the sale item DB 12e stores, as the sale item information, a shop ID, a sale item ID, a shape category ID, a color category ID, a pattern category ID, a sale item name, a sale item image, a feature value, and the like, for each item for sale that the shop sells, in association with each other. The shop ID indicates a shop of a selling source of an item for sale. The sale item ID is identification information for the shop to manage items for sale. The category IDs indicate categories assigned to an item for sale. In the information processing system S, a category of each of shape, color, and pattern can be assigned to one item for sale. The shop may register every category ID of shape, color, and pattern, or may register at least one category ID of them. Alternatively, the shop may not register category ID at all. The sale item image is an image representing an item for sale. The feature value indicates a feature of the sale item image. For example, when a sale item image is stored in the sale item DB 12e, the system control unit 14 analyzes the stored sale item image to extract a feature value. The system control unit 14 may extract a feature value, for example, by using a well-known method. The system control unit 14, using a feature value, searches for a sale item image similar to the specified image. A feature value stored in the sale item DB 12e may be, for example, a feature value of each of shape, color, and pattern. Alternatively, for example, one feature value may indicate a plurality of types of feature. For example, the sale item DB 12e may store a feature value that simultaneously indicates features of shape and color and a feature value indicating a feature of pattern, or may store a feature value indicating a feature of shape and a feature value that simultaneously indicates features of color and pattern. In addition, the sale item DB 12e may store a feature value that simultaneously indicates features of shape, color, and pattern.

In the present embodiment, categories of three classifications of shape, color, and pattern can be registered, and one or more feature values indicating three features of shape, color, and pattern are used for image search. However, only a category of each of one or two classifications can be registered, and one or more feature values indicating one or two features corresponding to the category may be used for image search.

The storage unit 12 further stores various kinds of data for displaying a web page, such as HTML (HyperText Markup Language) documents, XML (Extensible Markup Language) documents, image data, text data, and electronic documents. Further, the storage unit 12 stores various kinds of setting values.

In addition, the storage unit 12 stores various kinds of programs, such as Operating System, DBMS (Database Management System), and a server program. The server program is a program for causing the system control unit 14 to execute various kinds of processing regarding the online shopping mall. The processing that the server program causes the system control unit 14 to execute includes search of sale item images. Note that, various kinds of programs may be acquired, for example, from another server device and the like through the network NW, or may be recorded on a recording medium, such as a magnetic tape, an optical disc, or a memory card, and read via a drive device. In addition, the server program and the like may be a program product.

The input/output interface 13 is configured to perform interface processing between the communication unit 11 and the storage unit 12, and the system control unit 14.

The system control unit 14 includes a CPU (Central Processing Unit) 14a, a ROM (read Only Memory) 14b, a RAM (Random Access Memory) 14c, and the like. The CPU 14a is an example of a processor. Note that, the present invention is also applicable to various processors different from CPUs. Each of the storage unit 12, the ROM 14b, and the RAM 14c is an example of a memory. Note that, the present invention is also applicable to various memories different from hard disks, ROMs and RAMs.

Note that, the online shopping mall server 1 may include a plurality of server devices. For example, a server device that performs processing, such as order of items for sale in the online shopping mall, a server device that transmits web pages in response to requests from the shop terminals 2 and the user terminals 3, a server device that searches for items for sale, a server device that manages databases, and other server devices may be mutually connected via a LAN or the like.

[1-3. Function Summary of System Control Unit]

Next, a function summary of the system control unit 14 will be described with reference to FIGS. 6 to 13B. FIG. 6 is a diagram that illustrates one example of a function block of the system control unit 14 of the online shopping mall server 1 according to the present embodiment. FIG. 7 is a sequence chart that illustrates one example of an outline of processing of the information processing system S according to the present embodiment. The system control unit 14 functions, as shown in FIG. 6, as a specified image acquisition unit 141, a feature value extraction unit 142, a category acquisition unit 143, a search unit 144, a category registration unit 145, and the like, by the CPU 14*a* reading and executing various kinds of program codes included in a program, such as a server program. The specified image acquisition unit 141 is an example of a body image display control means and an image acquisition means in the present invention. The feature value extraction unit 142 is an example of an extraction means, a second storage control means, and a correction means in the present invention. The category acquisition unit 143 is an example of a category information acquisition means in the present invention. The search unit 144 is an example of a search means and a display control means in the present invention. The category registration unit 145 is an example of a storage control means in the present invention.

The specified image acquisition unit 141 acquires a specified image from the user terminal 3. For example, the specified image acquisition unit 141 transmits a specified image drawing page to the user terminal 3 (step S1 in FIG. 7). The specified image drawing page is a web page that displays a body image B and is a web page for a user to draw a specified image used for search of sale item images. For example, when the user terminal 3 accesses the online shopping mall, the system control unit 14 transmits a top page of the online shopping mall to the user terminal 3. In the top page, the user can specify search conditions for searching for an item for sale, such as a keyword and a category. In addition, in the top page, a link to the specified image drawing page is embedded. When the user selects the link, the specified image acquisition unit 141 transmits the specified image drawing page to the user terminal 3. Thereby, the specified image acquisition unit 141 causes the user terminal 3 to display the body image B. Note that, the specified image acquisition unit 141 may not cause the body image to be displayed. Especially, in a case where the present invention is applied to an item for sale different from the garment, display of the body image is not necessary.

Figure 9:
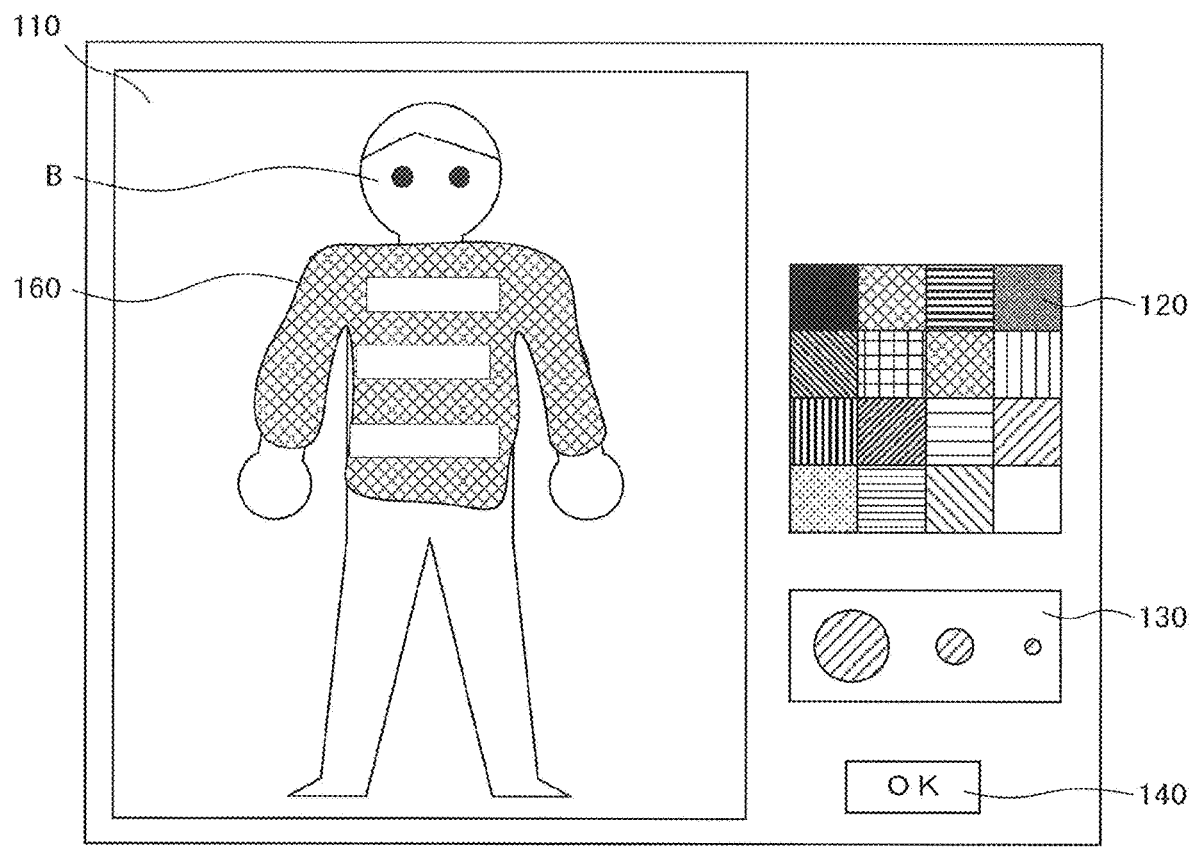
FIG. 9 is a diagram that illustrates one example of a specified image drawing page.

FIGS. 8 and 9 are diagrams that illustrate one example of the specified image drawing page. As shown in FIG. 8, the specified image drawing page includes a drawing area 110, a color selection area 120, a thickness selection area 130, an OK button 140, and the like. In the drawing area 110, the body image B is displayed. A user can draw a specified image in the drawing area 110. For example, a user draws an image representing a garment as the specified image on the body image B. In the color selection area 120, a plurality of colors are displayed. A user can select a color for drawing a specified image from among the plurality of colors displayed in the color selection area 120. In the thickness selection area 130, a plurality of areas that indicate thicknesses of brush are displayed. A user can select a thickness of brush for drawing a specified image from among the thicknesses that the plurality of areas displayed in the thickness selection area 130 indicate. A user draws points or lines with the selected color and thickness in the drawing area 110, by operating, for example, a mouse, a key, a touch panel, or the like. A user, by repeating this action, draws a specified image (step S2). For example, a specified image 160 drawn in FIG. 9 is a long-sleeve T-shirt with a red and white border pattern. At least the user thinks that he/she has drawn such a garment. The specified image drawing page may include, for example, an area for selecting a pattern of the specified image from among a plurality of patterns, an area for selecting parts of the garment, and the like.

The OK button 140 is a button for requesting search for sale item images with the drawn specified image. When a user selects the OK button 140, the user terminal 3 transmits an image search request to the online shopping mall server 1 (step S3). The image search request includes a specified image and a user ID of a user who has drawn the specified image. Thus, the specified image acquisition unit 141 acquires the specified image.

Note that, the specified image acquisition unit 141 may acquire, from the user terminal 3, as the specified image, an image that the used has not drawn, for example, such as an image photographed with a camera or an image acquired from the Internet.

The feature value extraction unit 142 extracts a feature value from the specified image acquired by the specified image acquisition unit 141 (step S4). The feature value extracted from the specified image is mainly used for searching for sale item images. Therefore, the feature value extraction unit 142 may extract, from the specified image, a feature value of the same type as the feature value registered in the sale item DB 12*e*.

The category acquisition unit 143 acquires a category ID that indicates a category corresponding to an item for sale represented by the specified image acquired by the specified image acquisition unit 141 (step S5). The category acquisition unit 143 acquires a category ID for each category classification. In the present embodiment, a category ID is acquired as category information. However, the category acquisition unit 143 may acquire a category name as the category information.

In a case of a shape, the category acquisition unit 143 may acquire a category ID corresponding to a shape of a garment represented by the specified image, for example, based on which part of the body represented by the body image B a garment represented by the specified image covers. At this time, the category acquisition unit 143 may use body cover information registered in the shape category DB 12*b*. Specifically, the category acquisition unit 143 identifies which body parts, of the body parts P1 to P33, the garment represented by the specified image covers. The category acquisition unit 143 compares, for example for each category, a region that the garment represented by the specified image covers with a region that the body cover information corresponding to the category indicates. Then, the category acquisition unit 143 calculates, for each category, a matching degree of a range that covers the body. For example, the larger the number of body parts that are covered among the body parts for which the cover flags are TRUE, the higher the matching degree is. Further, the larger the number of body parts that are not covered among the body parts for which the cover flags are FALSE, the higher the matching degree is. The category acquisition unit 143 determines the category corresponding to the body cover information having the highest matching degree as a category corresponding to a shape of the garment represented by the specified image. Note that, the category acquisition unit 143 may not acquire a shape category, in a case where a shape in which the matching degree of a range that covers the body is not less than a predetermined value does not exist.

Figure 10:
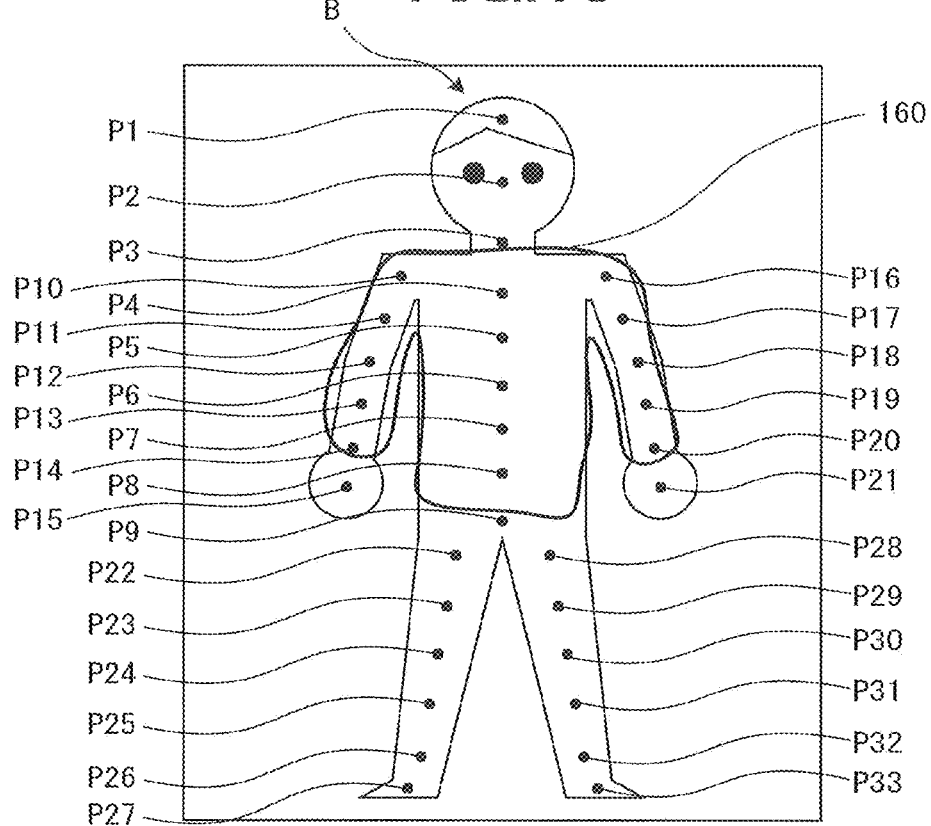
FIG. 10 is a diagram that illustrates one example of a positional relation between a garment represented by a specified image and body parts.

FIG. 10 is a diagram that illustrates one example of a positional relation between garments represented by the specified image and body parts. The specified image 160 shown in FIG. 9 covers, among the body parts P1 to P33, only body parts P4 to P8, P10 to P14, and P16 to P20. For example, in the body cover information of long-sleeve T-shirt, mini-skirt, and short-sleeve dress shown in FIGS. 5A to 5C, the matching degree to the body cover information of the long-sleeve T-shirt is the highest. Thus, the category acquisition unit 143 acquires the category ID of the long-sleeve T-shirt corresponding to the specified image 160.

In the present embodiment, the category acquisition unit 143 acquires a category ID indicating a shape by using the body image B which is common to all users. However, a user may prepare a body image by himself/herself. For example, when a user specifies a body image stored in the user terminal 3, the user terminal 3 may display the specified body image in the drawing area 110. When a user draws a body image and selects the OK button 140, the user terminal 3 transmits an image search request including the specified image and the body image to the online shopping mall server 1. The category acquisition unit 143 identifies coordinates of each body part represented by the body image by analyzing the body image. The category acquisition unit 143 identifies a range that the garment represented by the specified image covers in the body represented by the body image, based on the identified coordinates.

In a case where a feature value at least indicating a shape is acquired by the feature value extraction unit 142, the category acquisition unit 143 may acquire a category ID corresponding to the shape of the garment represented by the specified image, based on the feature value.

In a case of a color, the category acquisition unit 143 may acquire a category ID corresponding to the color of the garment represented by the specified image, for example, based on the feature value that was acquired by the feature value extraction unit 142 and at least indicates the color. For example, the category acquisition unit 143 determines a typical color of the garment represented by the specified image, based on the feature value. The category acquisition unit 143 acquires a category ID corresponding to the determined color from the color category DB 12c. Note that, the category acquisition unit 143 may not acquire a category ID of the color in a case where the typical color was not identified.

In a case of a pattern, the category acquisition unit 143 may acquire a category ID corresponding to the color of the garment represented by the specified image, for example, based on the feature value that was acquired by the feature value extraction unit 142 and at least indicates the pattern. For example, the category acquisition unit 143 may compare a feature value of the pattern of the specified image with a feature value registered in the pattern category DB 12d. Then, the category acquisition unit 143 calculates, for each category, a matching degree of a feature value. The category acquisition unit 143 determines a category having the highest matching degree of the feature value as a category corresponding to the pattern of the garment represented by the specified image. Note that, the category acquisition unit 143 may not acquire a category ID of a pattern, in a case where a pattern in which the matching degree of the feature value is not less than a predetermined value is not identified.

Figure 11:
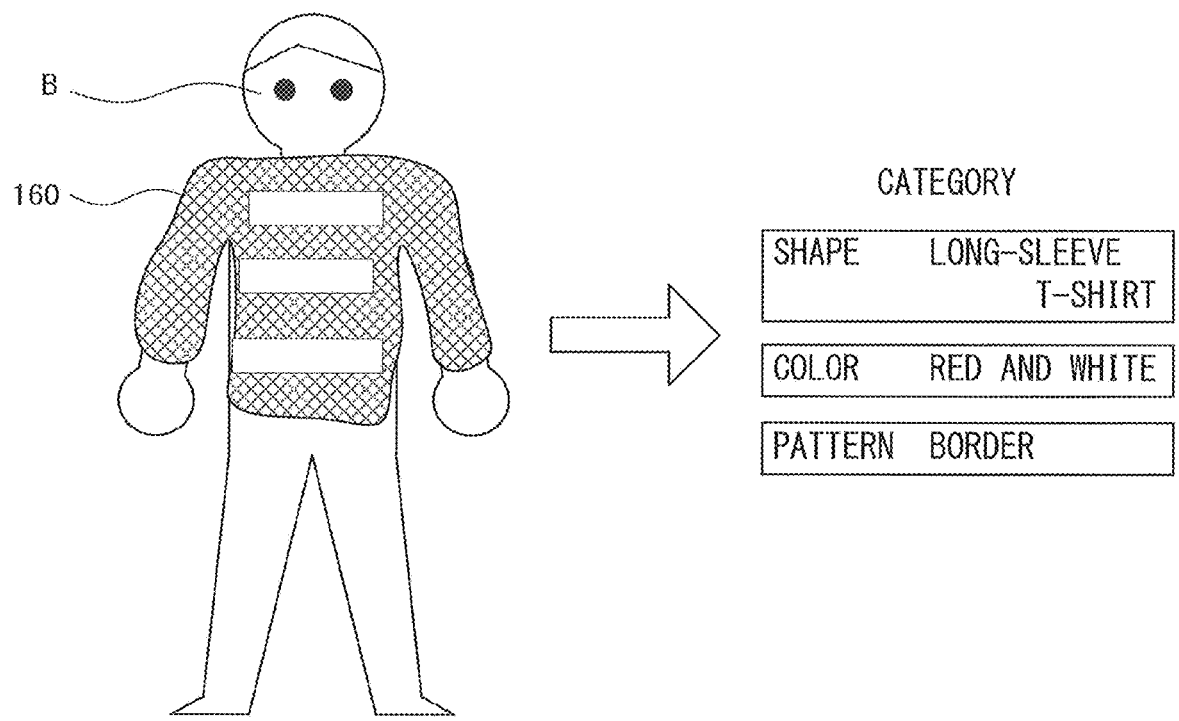
FIG. 11 is a diagram that illustrates one example of acquisition of a category ID.

FIG. 11 is a diagram that illustrates one example of acquisition of a category ID. In a case of the specified image 160 shown in FIG. 9, the category acquisition unit 143 acquires a category ID indicating the long-sleeve T-shirt as a shape category ID. The category acquisition unit 143 acquires a category ID indicating red and white as a category ID of the color. The category acquisition unit 143 acquires a category ID indicating a border as a category ID of the pattern.

The search unit 144 searches for sale item images similar to the specified image from the sale item DB 12e, based on a feature value acquired by the feature value extraction unit 142 (step S6). Searching for sale item images is searching for items for sale represented by the sale item images. Specifically, the search unit 144 calculates a similarity degree between the specified image and each sale item image by comparing a feature value of the specified image with a feature value registered in the sale item DB 12e. In a case where a plurality of types of feature values are registered for one sale item image in the sale item DB 12e, the search unit 144 calculates a feature value by comparing feature values for each type. Then, the search unit 144 calculates a final similarity degree, based on the similarity degrees for respective types. For example, the search unit 144 may calculate an average value of a plurality of the calculated similarity degrees. The average value may be a weighted average, for example. The search unit 144 identifies, as similar sale item images, sale item images each having a similarity degree not less than a preset reference similarity degree, among the sale item images registered in the sale item DB 12e.

Figure 12:
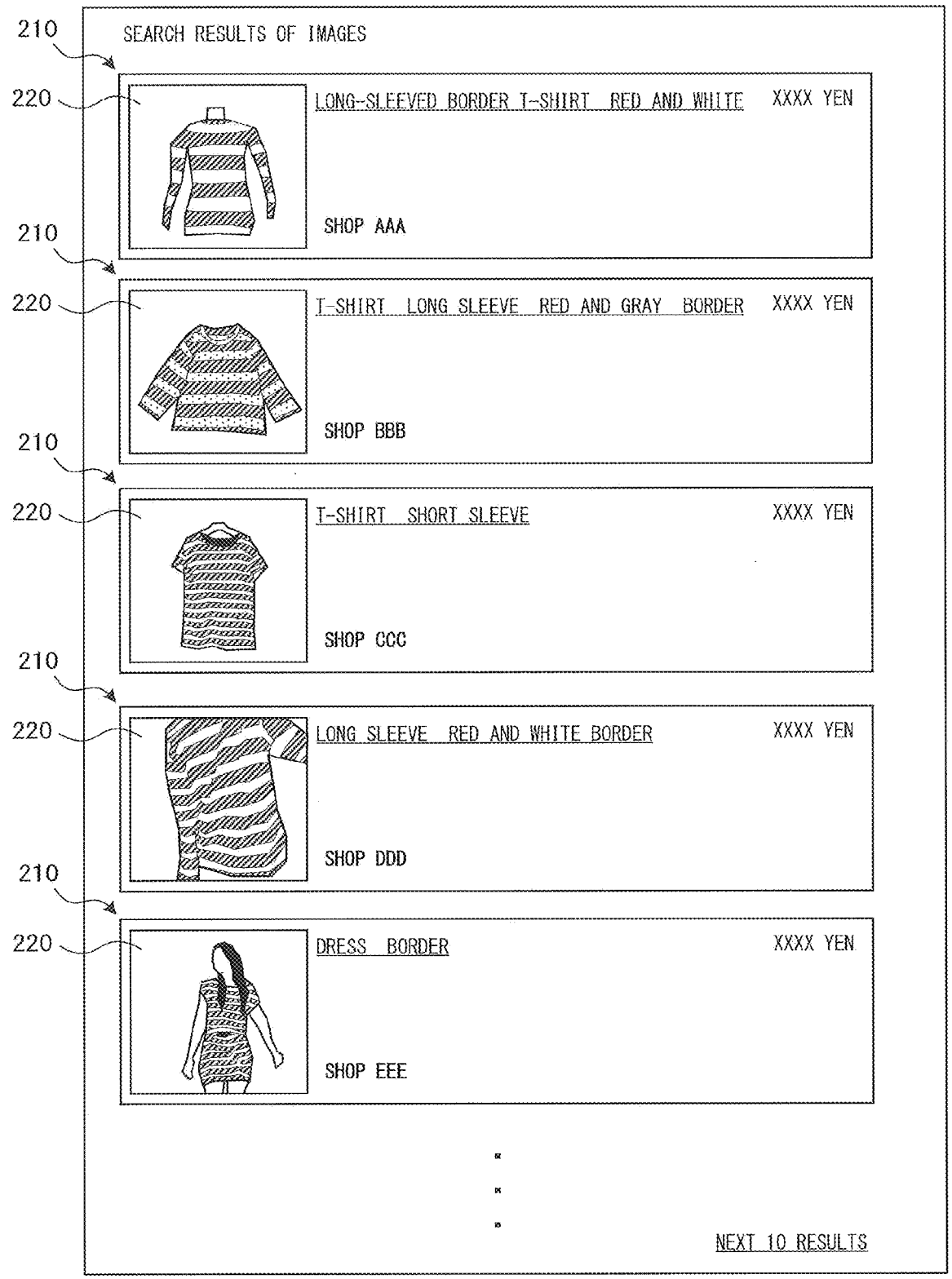
FIG. 12 is a diagram that illustrates one example of a search result page.

The search unit 144 causes the user terminal 3 to display at least one of the found sale item images as the search result. Specifically, the search unit 144 transmits a search result page to the user terminal 3 (step S7). The search result page is a web page that displays the search result of the item for sale. FIG. 12 is a diagram that illustrates one example of a search result page. As shown in FIG. 12, the search result page includes a plurality of sale item information display areas 210. In each sale item information display area 210, information about the found item for sale is displayed. The sale item information display area 210 includes at least a sale item image 220. The sale item information display area 210 may further include a sale item name, a price, a name of a shop of a selling source of the item for sale, and the like. The sale item image displayed in the search result page is an image similar to the specified image. Therefore, the shape, color, and pattern of a garment indicated by the displayed sale item image are likely to be the shape, color, and pattern that the user desires. However, this is not necessarily true. For example, in a case where a user drew the specified image 160 as shown in FIG. 9, there is a probability that the found sale item images include many sale item images that represent long-sleeve T-shirts with red and white border pattern. However, the found sale item images may include, for example, a dress with red and white border pattern, a red and solid short-sleeve T-shirt, and the like.

The search unit 144 may generate a search result page, for example, so that the sale item image having a higher similarity degree with the specified image is preferentially displayed. For example, the search unit 144 may determine a display rank for each of the found sale item images. The display rank indicates a priority rank in which the sale item images are displayed as the search result. The search unit 144 raises the display rank of the sale item image having a higher similarity degree.

The search unit 144 may make the user terminal 3 preferentially display, for example, the sale item image corresponding to a category ID that matches the category ID acquired by the category acquisition unit 143, among the sale item images similar to the specified image. For example, the search unit 144 may calculate a search score for each of the found sale item images. The search score indicates a height of association between the sale item image and the specified image. For example, the search unit 144 calculates a score corresponding to the similarity degree with the specified image. The higher the similarity degree is, the higher the score is. Further, the search unit 144, for each of the three classifications of shape, color, and pattern, determines whether or not a category ID corresponding to the sale item image matches a category ID acquired by the category acquisition unit 143 matches each other. In a case where the category IDs match each other, the search unit 144 adds a predetermined value to the calculated score. Thus, the search unit 144 calculates the search score for each sale item image. The search unit 144 raises the display rank of the sale item image having the higher search score. Alternatively, the search unit 144 may raise the display rank of the sale item image having a larger number of category IDs that matches the category IDs acquired by the category acquisition unit 143, among the corresponding category IDs of shape, color, and pattern. Alternatively, the search unit 144 may make the user terminal 3 display only the sale item image in which at least any one of the category IDs of shape, color, and pattern matches any category ID acquired by the category acquisition unit 143, among the sale item images similar to the specified image.

A user selects a sale item image 220 or a sale item name in any sale item information display area 210 from among the sale item information display areas 210 included in the search result page displayed by the user terminal 3 (step S8). Selecting the sale item image 220 or sale item name is also selecting the item for sale represented by the sale item image. When the sale item image is selected, the user terminal 3 transmits a sale item page request to the online shopping mall server 1 (step S9). The sale item page request includes a sale item ID of the selected sale item image and a user ID of the user who has selected. The search unit 144 transmits, to the user terminal 3, a sale item page corresponding to a sale item ID included in the sale item page request received from the user terminal 3 (step S10). The sale item page is a web page that displays detailed information of a specific item for sale. For example, the sale item page includes a sale item name, a sale item image, a price, description of an item for sale, and the like.

The category registration unit 145, in a case where a user has selected any sale item image from the search result displayed by the user terminal 3, stores a category ID acquired by the category acquisition unit 143 in the sale item DB 12*e* in association with a category ID corresponding to the found sale item image (step S11). This automatically associates a category with an item for sale. The feature value extracted from the specified image is likely to indicate a feature of appearance of the item for sale represented by the specified image. The feature of the item for sale represented by the specified image is a feature of an item for sale that the user is likely to desire. Therefore, the category ID acquired by the category acquisition unit 143 is a category indicating a feature of the item for sale that the user is likely to desire. The sale item image included in the search result is similar to the specified image. Therefore, the feature of the item for sale represented by the found sale item image may be identical or similar to the feature of the item for sale represented by the specified image. Since a user searches for an item for sale having a desired feature from the search result, the feature of the item for sale represented by the sale item image that the user has selected from the search result is a feature that the user is likely to desire. Accordingly, the category indicated by the category ID acquired by the category acquisition unit 143 is highly likely to be appropriate as a category to which the item for sale represented by the sale item image selected by the user belongs. Therefore, according to the selection of a sale item image by the user, an appropriate category is automatically associated with an item for sale represented by the selected sale item image.

A category ID may be already stored in the sale item DB 12*e* in association with the sale item ID of the sale item image before the selection of the sale item image by the user. In a case where any category ID indicating a category belonging to the same category classification as the category classification to which the category indicated by the category ID acquired by the category acquisition unit 143 belongs is not stored in the sale item DB 12*e*, the category registration unit 145 may register the acquired category ID in the sale item DB 12*e*. Thereby, the category registration unit 145 can associate a category of a category classification that has been lacking until now with an item for sale.

FIG. 13A illustrates an example of registration of a category ID. In the example shown in FIG. 13A, in the sale item DB 12*e*, the category ID indicating a short-sleeve T-shirt and the category ID indicating red and white are already registered in association with the sale item ID of the selected sale item image. The category acquisition unit 143, based on the specified image, acquired the category ID indicating a long-sleeve T-shirt, the category ID indicating red and white, and the category ID indicating a border. The category ID of a pattern is not yet registered in the sale item DB 12*e*. Therefore, the category registration unit 145 newly registers the category ID indicating a border in the sale item DB 12*e*. The shape category ID and the color category ID are not changed.

In addition, in a case where a category ID indicating a category incompatible with a category indicated by the category ID acquired by the category acquisition unit 143 is already stored in the sale item DB 12*e*, the category registration unit 145 changes the category ID to be stored in the sale item DB 12*e* from the already stored category ID to the category ID acquired by the category acquisition unit 143. Thereby, in a case where the category associated with the item for sale by the shop is a mistaken category, the category acquisition unit 143 can automatically correct the mistake. In a case where it usually would not happen that one item for sale belongs to two categories at the same time, that is, there is contradiction, these categories are mutually exclusive. Accordingly, in a case where a category ID indicating a category indicating a category incompatible with a category indicated by the acquired category ID is already registered in the sale item DB 12*e*, the already stored category ID is likely to have been registered by the shop by mistake.

FIG. 13B illustrates an example of registration of a category ID. In the example shown in FIG. 13B, in the sale item DB 12*e*, the category ID indicating a short-sleeve T-shirt and the category ID indicating red and white and check are already registered in association with the sale item ID of the selected sale item image. The category acquisition unit 143, based on the specified image, acquired the category ID indicating a long-sleeve T-shirt, the category ID indicating red and gray, and the category ID indicating a border. It is contradictory that the selected item for sale is a short-sleeve T-shirt and a long-sleeve T-shirt. Therefore, the category registration unit 145 changes the shape category ID to be stored in the sale item DB 12*e* from the category ID indicating a short-sleeve T-shirt to the category ID indicating a long-sleeve T-shirt. It is generally contradictory that the color of the selected item for sale is red and white as well as red and gray. Therefore, the category registration unit 145 changes the color category ID to be registered in the sale item DB 12*e* from the category ID indicating red and white to the category ID indicating red and gray. It is generally contradictory that the pattern of the selected item for sale is check and border. Therefore, the category registration unit 145 changes the color category ID to be registered in the sale item DB 12*e* from the category ID indicating check to the category ID indicating red and gray.

The shape category is hierarchically defined with a tree structure as the shape category DB 12*b* indicates. In this case, the category registration unit 145 can determine whether or not two categories are mutually exclusive, based on a positional relation of these categories in the tree structure. Specifically, in a case where the relation between two categories is not a relation between ancestor and descendant, these categories are basically mutually exclusive. For example, the relation between the short-sleeve T-shirts and the long-sleeve T-shirts is not a relation between ancestor and descendant. In addition, for example, the relation between tops and pants is not a relation between ancestor and descendant. Further, for example, the relation between T-shirts and cut and sew is a brother relation and not a relation between ancestor and descendant. On the other hand, in a case where the two categories match each other or the relation between these categories is a relation between ancestor and descendant, these categories are not mutually exclusive. For example, the T-shirts are a child of the tops, and thus the relation between these categories is a relation between ancestor and descendant. It is not contradictory that one item for sale is a T-shirt and a top. The mini-skirts are a grandchild of the bottoms. In these cases, the category registration unit 145 does not need to change the category ID stored in the sale item DB 12*e*. However, in a case where the category ID indicating a category of ancestor of the category indicated by the category ID acquired by the category acquisition unit 143 is already stored in the sale item DB 12*e*, the category registration unit 145 may change the category ID to be stored in the sale item DB 12*e* to the category ID acquired by the category acquisition unit 143. For example, the category may be changed from the tops to the T-shirts. That is, the category associated with the item for sale is changed to a more specific category.

The categories of color and pattern are not hierarchically defined. In this case, the category registration unit 145, when two categories are different, may determine that these categories are mutually exclusive.

Note that, in a case where a category ID indicating a category that belongs to the same category classification as the category classification to which the category indicated by the category ID acquired by the category acquisition unit 143 belongs is stored in the sale item DB 12*e*, the category registration unit 145 may unconditionally change the category ID to be stored in the sale item DB 12*e* from the already stored category ID to the acquired category ID.

When the user terminal 3 is displaying a sale item page on the display, a user performs operation for re-displaying a search result page. Then, the user terminal 3 transmits a search result page re-request to the online shopping mall server 1 (step S12). The search unit 144, in response to the search result page re-request, transmits the search result page to the user terminal 3 (step S13). Thereby, the search unit 144 causes the user terminal 3 to display the search result. At this time, the search unit 144 may transmit a search result page having the same contents as the search result page transmitted in step S7. That is, the search unit 144 may cause the user terminal 3 to display the found sale item image with the same display ranks as the display ranks determined in step S7. Alternatively, the search unit 144 may cause the user terminal 3 to preferentially display an image similar to the selected sale item image among the found sale item images, based on the feature value of the sale item image selected in step S8. For example, the search unit 144 may raise the display rank of the sale item image having the higher similarity degree with the selected sale item image. In addition, for example, the search unit 144 may generate a search result page so that only the sale item images similar to the selected sale item image among the found sale item images are displayed.

Note that, the search unit 144 executes also category search. Specifically, a user, when a top page is being displayed on the display of the user terminal 3, selects a category as the search condition. Then, the user terminal 3 transmits a search request including a category ID indicating the selected category to the online shopping mall server 1. The search unit 144 searches, from the sale item DB 12*e*, for sale item information corresponding to a category ID that matches the category ID included in the search request. The search unit 144 generates a search result page based on the found sale item information and transmits it to the user terminal 3.

[1-4. Operation of Information Processing System]

Next, an operation of the information processing system S will be described with reference to FIGS. 14A to 17.

Figure 14A:
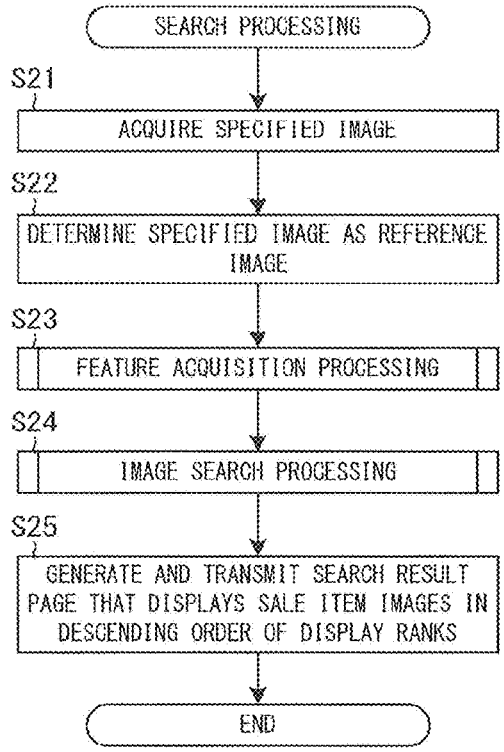
FIG. 14A is a flowchart that illustrates one example of search processing of the system control unit 14 of the online shopping mall server 1 according to one embodiment.

FIG. 14A is a flowchart that illustrates one example of search processing of the system control unit 14 of the online shopping mall server 1 according to the present embodiment. When the online shopping mall server 1 has received an image search request from the user terminal 3 that displays a specified image drawing page, the system control unit 14 executes search processing.

As shown in FIG. 14A, the specified image acquisition unit 141 acquires a specified image from the image search request received from the user terminal 3 (step S21). Next, the specified image acquisition unit 141 determines the specified image as a reference image (step S22). The reference image is a parameter of feature acquisition processing and image search processing to be described next.

Figure 14B:
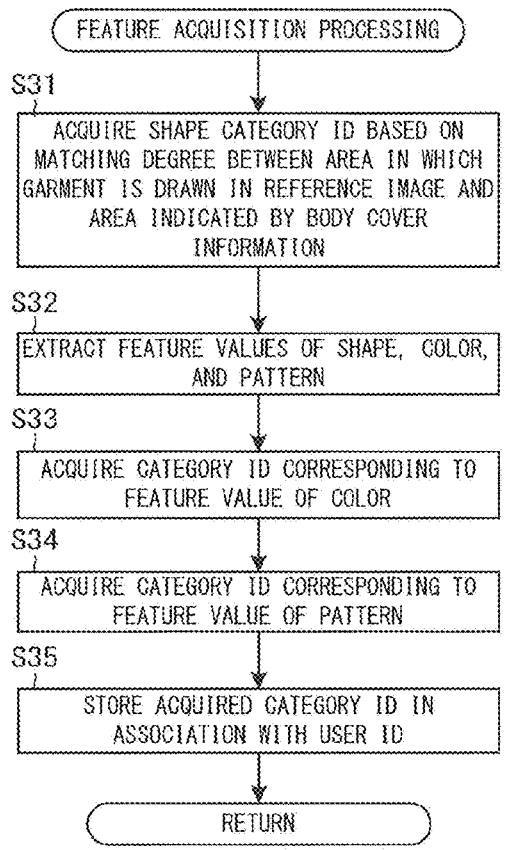
FIG. 14B is a flowchart that illustrates one example of feature acquisition processing of the system control unit 14 of the online shopping mall server 1 according to one embodiment.

Next, the system control unit 14 executes the feature acquisition processing. FIG. 14B is a flowchart that illustrates one example of the feature acquisition processing of the system control unit 14 of the online shopping mall server 1 according to the present embodiment. As shown in FIG. 14B, the category acquisition unit 143 acquires a shape category ID, based on a matching degree between an area in which a garment is drawn in the reference image and an area indicated by body cover information (step S31). For example, the category acquisition unit 143 identifies an outline of the garment from the reference image to identify the area in which the garment is drawn. In addition, the category acquisition unit 143 determines whether or not each body part is included in the area in which the garment is drawn by comparing the area in which the garment is drawn with the coordinates of each body part. The body parts included in the area in which the garment is drawn are covered with the garment. The category acquisition unit 143 acquires, for each category ID, body cover information registered in the shape category DB 12*b*. The category acquisition unit 143 determines one point for each of the body parts covered in the area in which the garment is drawn in the reference image and determines zero point for each of the body parts not covered among the body parts for which the cover flags are TRUE in the body cover information. In addition, the category acquisition unit 143 determines zero point for each of the body parts covered in the area in which the garment is drawn in the reference image and determines one point for each of the body parts not covered among the body parts for which the cover flags are FALSE. The category acquisition unit 143 calculates the sum of all points as the matching degree. The category acquisition unit 143 acquires a category ID having the highest matching degree among the category IDs registered in the shape category DB 12*b*.

Next, the feature value extraction unit 142 extracts a feature value of each of shape, color, and pattern from the reference image (step S32). Next, the feature value extraction unit 142 identifies a typical color represented by the reference image, based on the extracted feature value of color. Then, the category acquisition unit 143 acquires a category ID corresponding to the identified color from the color category DB 12*c* (step S33). Next, the feature value extraction unit 142 identifies a feature value having the highest matching degree with the feature value extracted from the reference image among the feature values registered in the pattern category DB 12*d*. The category acquisition unit 143 acquires a category ID corresponding to the identified feature value from the pattern category DB 12*d* (step S34).

Next, the category acquisition unit 143 stores the category IDs acquired in steps S31, S33, and S34 in the RAM 14*c* in association with the user ID included in the image search request (step S35), and terminates the feature acquisition processing.

After the feature acquisition processing is terminated, the search unit 144 executes the image search processing as shown in FIG. 14A. FIG. 15 is a flowchart that illustrates one example of the image search processing of the system control unit 14 of the online shopping mall server 1 according to the present embodiment. As shown in FIG. 15, the search unit 144 calculates a similarity degree between the reference image and each sale item image stored in the sale item DB 12*e*, based on the feature value extracted in the feature acquisition processing and the feature value stored in the sale item DB 12*e* (step S41). Next, the search unit 144 searches for sale item images having the similarity degree not less than the reference similarity degree among the sale item images stored in the sale item DB 12*e* (step S42).

Next, the search unit 144 calculates a search score for each of the found sale item images (step S43). For example, the search unit 144 calculates a higher search score as the similarity degree with the specified image is higher, and calculates a higher search score as the number of category IDs that match the category IDs acquired by the category acquisition unit 143 among the category IDs registered in the sale item DB 12*e* is larger. Next, the search unit 144 determines the display rank of each of the identified sale item images according to the search score (step S44), and terminates the image search processing.

After the image search processing is terminated, the search unit 144 generates an HTML document of the search result page as shown in FIG. 14A (step S25). The search unit 144, based on the sale item DB 12*e*, generates an HTML document including a sale item ID, a sale item name, an image tag for displaying a sale item image, an anchor tag that indicates a link to a sale item page, and the like, for each of the found sale item images. At this time, the search unit 144 generates the HTML document so that the sale item images are displayed in the descending order of the display ranks. The search unit 144 transmits the generated HTML document to the user terminal 3 and terminates the search processing.

Figure 16A:
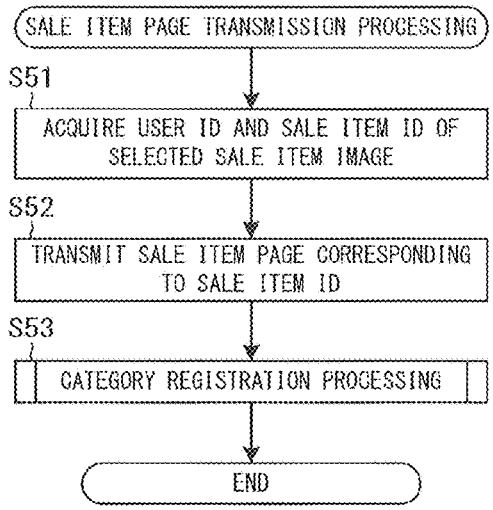
FIG. 16A is a flowchart that illustrates one example of sale item page transmission processing of the system control unit 14 of the online shopping mall server 1 according to one embodiment.

FIG. 16A is a flowchart that illustrates one example of sale item page transmission processing of the system control unit 14 of the online shopping mall server 1 according to the present embodiment. When the online shopping mall server 1 has received a sale item page request from the user terminal 3 that displays the search result page, the system control unit 14 executes sale item page transmission processing.

As shown in FIG. 16A, the search unit 144 acquires a user ID from the sale item page request and a sale item ID corresponding to the selected sale item image (step S51). Next, the search unit 144 transmits, to the user terminal 3, a sale item page corresponding to the acquired sale item ID (step S52).

Figure 16B:
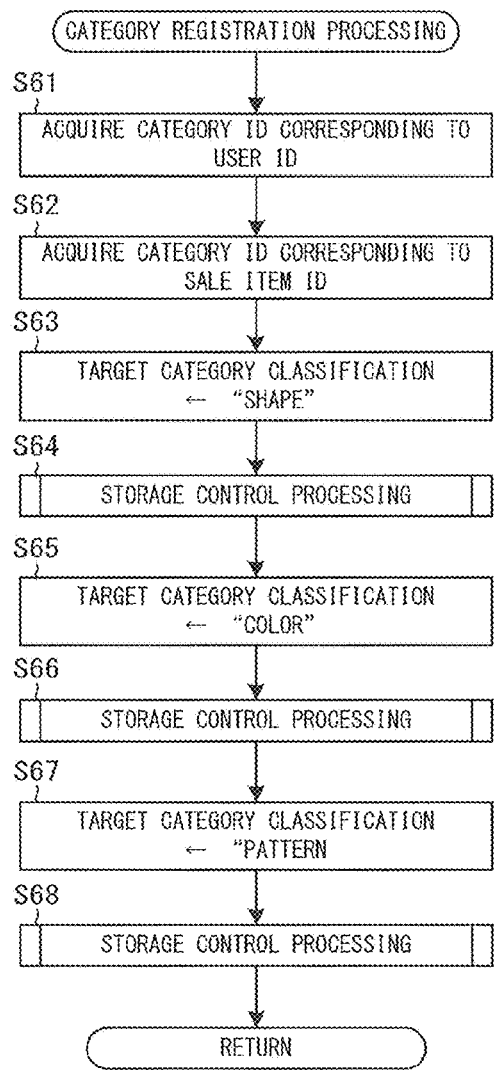
FIG. 16B is a flowchart that illustrates one example of category registration processing of the system control unit 14 of the online shopping mall server 1 according to one embodiment.

Next, the category registration unit 145 executes category registration processing (step S53). FIG. 16B is a flowchart that illustrates one example of the category registration processing of the system control unit 14 of the online shopping mall server 1 according to the present embodiment. As shown in FIG. 16B, the category registration unit 145 acquires, from the RAM 14*c*, a category ID corresponding to the user ID included in the sale item page request as a category ID of the specified image (step S61). Next, the search unit 144 acquires, from the sale item DB 12*e*, a category ID corresponding to the sale item ID corresponding to the selected sale item image as a category ID of the selected sale item image (step S62). Next, the search unit 144 sets a target category classification to "shape" (step S63). Next, the search unit 144 executes storage control processing (step S64). In the storage control processing, storage control of a category ID of the target category classification is performed. The detail of the storage control processing will be described below. Next, the search unit 144 sets the target category classification to "color" (step S65) and executes the storage control processing (step S66). Next, the search unit 144 sets the target category classification to "pattern" (step S67) and executes the storage control processing (step S68). Then, the category registration unit 145 terminates the category registration processing. After the category registration processing is terminated, the search unit 144 terminates the sale item page transmission processing.

FIG. 17 is a flowchart that illustrates one example of the storage control processing of the system control unit 14 of the online shopping mall server 1 according to the present embodiment. As shown in FIG. 17, the category registration unit 145 determines whether or not a category ID of the target category classification among the category IDs of the selected sale item image is already stored in the sale item DB 12*e* (step S71). At this time, the category registration unit 145, when having determined that the category ID of the target category classification is stored in the sale item DB 12*e* (YES in step S71), proceeds to step S72. On the other hand, the category registration unit 145, when having determined that the category ID of the target category classification is not stored in the sale item DB 12*e* (NO in step S71), proceeds to step S76.

In step S72, the category registration unit 145 determines whether or not the category ID of the target category classification among the category IDs of the specified image matches the category ID of the target category classification of the selected sale item image. At this time, the category registration unit 145, when having determined that the category IDs match each other (YES in step S72), terminates the storage control processing. On the other hand, the category registration unit 145, when having determined that the category IDs do not match each other (NO in step S72), proceeds to step S73.

In step S73, the category registration unit 145 determines whether or not the target category classification is "shape". At this time, the category registration unit 145, when having determined that the target category classification is "shape"

(YES in step S73), proceeds to step S74. On the other hand, the category registration unit 145, when having determined that the target category classification is not "shape" (NO in step S73), proceeds to step S75.

In step S74, the category registration unit 145 determines whether or not a category indicated by the category ID of the selected sale item image in the target category classification is a descendant of the category indicated by the category ID of the specified image. The category registration unit 145 can determine whether or not the category indicated by the category ID of the selected sale item image is a descendant, based on category IDs, parent category IDs, and child category ID lists registered in the shape category DB 12*b*. The category registration unit 145, when having determined that the category indicated by the category ID of the selected sale item image is a descendant (YES in step S74), terminates the storage control processing. On the other hand, the category registration unit 145, when having determined that the category indicated by the category ID of the selected sale item image is not a descendant (NO in step S74), proceeds to step S75.

In step S75, the category registration unit 145 deletes the category ID of the target category classification among the category IDs of the selected sale item image from the sale item DB 12*e*, and proceeds to step S76. In step S76, the category registration unit 145 stores the category ID of the target category classification among the category IDs of the specified image in the sale item DB 12*e*, and terminates the storage control processing.

As described above, according to the present embodiment, the system control unit 14 acquires the specified image. The system control unit 14 extracts a feature value of the specified image. The system control unit 14 acquires a category ID that indicates a category corresponding to the item for sale represented by the specified image among a plurality of categories for classifying items for sale. The system control unit 14 searches, from the storage unit 12, for sale item images similar to the specified image, based on the extracted feature value. The system control unit 14 causes at least one of the found sale item images to be displayed as the search result. The system control unit 14, when the user has selected any one sale item image from the displayed search result, stores the acquired category ID in the storage unit 12 in association with the sale item ID corresponding to the selected sale item image. Therefore, according to the selection by the user, an appropriate category is automatically associated with the selected item for sale, and thus the labor of associating an item for sale with a category can be reduced.

In addition, the system control unit 14, when causing the search result to be re-displayed after any one sale item image is selected by the user from the displayed search result, may cause the sale item image similar to the selected sale item image among the found sale item images to be preferentially displayed based on the feature value of the selected sale item image. In this case, the system control unit 14 can cause especially the sale item image representing an item for sale that the user is highly likely to desire among the sale item images similar to the specified image to be preferentially displayed.

In addition, the system control unit 14 may cause the body image to be displayed. The system control unit 14 may acquire a specified image that is drawn by the user on the displayed body image. The system control unit 14 may acquire a category ID indicating a category corresponding to a garment represented by the drawn specified image among a plurality of categories for classifying shapes of the garment, based on which part of the body represented by the displayed body image the garment represented by the drawn specified image covers. In this case, the system control unit 14 can associate a category indicating an appropriate shape with the selected item for sale.

In addition, the system control unit 14 may cause the sale item image corresponding to the category ID that matches the acquired category ID among the sale item images similar to the specified image to be preferentially displayed. In this case, the system control unit 14 can cause especially the sale item image representing an item for sale that the user is highly likely to desire among the sale item images similar to the specified image to be preferentially displayed.

In addition, the system control unit 14 may acquire, for at least one category classification of a plurality of category classifications to each of which a plurality of categories belong, a category ID indicating a category corresponding to an item for sale represented by the specified image among the plurality of categories belonging to the category classification. Further, the system control unit 14 may store the acquired category ID in the storage unit 12 in a case where any category ID indicating a category belonging to the same category classification as the category classification to which the category indicated by the acquired category ID belongs is not stored in the storage unit 12 in association with the selected sale item image. In this case, when for at least one category classification among a plurality of category classifications, a category is not associated with an item for sale, the system control unit 14 can automatically associate a category of the category classification with the item for sale.

Further, the system control unit 14, in a case where a category ID indicating a category incompatible with the category indicated by the acquired category ID is already stored in the storage unit 12 in association with the selected sale item image, may change the category ID to be stored in the storage unit 12 from the already stored category ID to the acquired category ID. In this case, the system control unit 14 can correct the category associated with the item for sale by mistake.

2. Second Embodiment

[2-1. Function Summary of System Control Unit]

Next, a function summary of the system control unit 14 in the second embodiment will be described with reference to FIGS. 18A to 19. The second embodiment is basically the same as the first embodiment except the points described below. In a case where a user draws a specified image, the specified image does not always correctly represent a feature of a garment that the user desires. For example, depending on a habit or predisposition of how to draw an image by the user, there may be discrepancy between the feature of a garment represented by the specified image and the feature of a garment that the user desires. For example, the user has drawn the specified image representing a long-sleeved garment, but it is assumed that the user has selected a sale item image representing a short-sleeved garment from the search result. In this case, it is presumed that the length of the sleeve drawn by the user tends to be longer than that desired by the user. Thus, the feature value extraction unit 142, in a case where there is a difference which satisfies a predetermined condition between the feature value of the specified image and the feature value of the sale item image selected from the search result, stores correction information indicating contents of correction for reducing the difference in the storage unit 12 in association with the user ID of the user. When has newly drawn a specified image, the feature value extraction unit 142 extracts a feature value from the new specified image. The feature value extraction unit 142 corrects the newly extracted feature value, based on the correction information corresponding to the user ID of the user. The search unit 144 searches for sale item images similar to the new specified image from the sale item DB 12e, based on the corrected feature value. This can increase probability that a sale item image representing a garment having a feature desired by the user is identified as the search result, even if the user has a habit or predisposition of how to draw an image.

For example, the feature value extraction unit 142 calculates a numerical value representing a difference between the feature value of the specified image and the feature value of the selected sale item image. When the difference is larger than a predetermined value, the feature value extraction unit 142 may calculate correction information, for example, by subtracting the feature value of the specified image from the feature value of the selected sale item image. When a specified image is newly drawn, the feature value extraction unit 142 may correct the feature value by adding the correction information to the feature value of the new specified image.

The feature value extraction unit 142 may use any of the feature values of shape, color, and pattern. For example, when the feature value of shape is used, the feature value extraction unit 142 generates correction information for reducing a difference between the shape of a garment represented by the specified image and the shape of a garment represented by the selected sale item image.

Figure 18A:
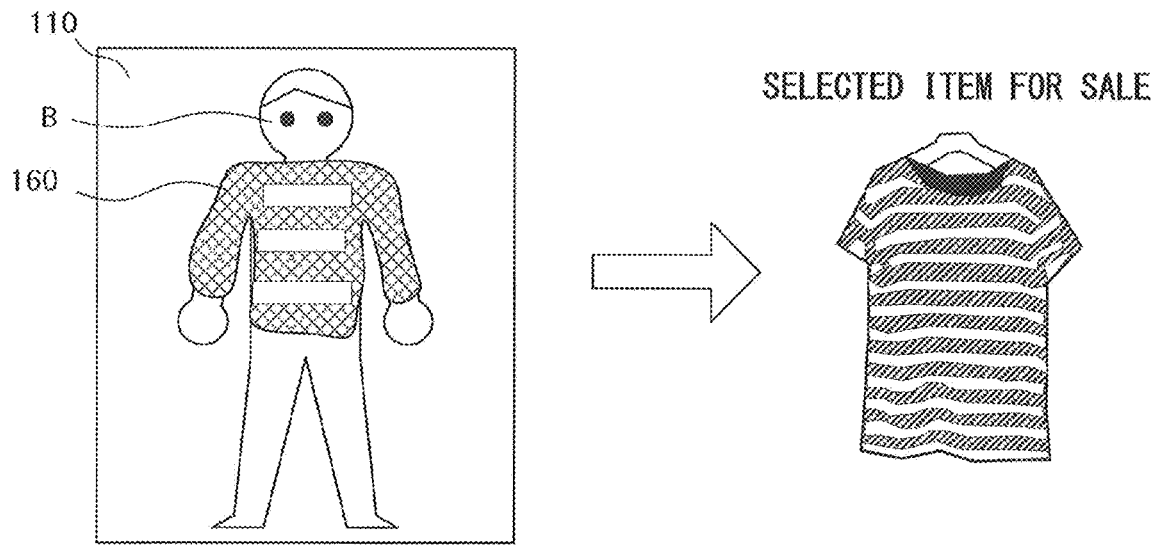
FIG. 18A is a diagram that illustrates an example of a specified image and a selected sale item image.
Figure 18B:
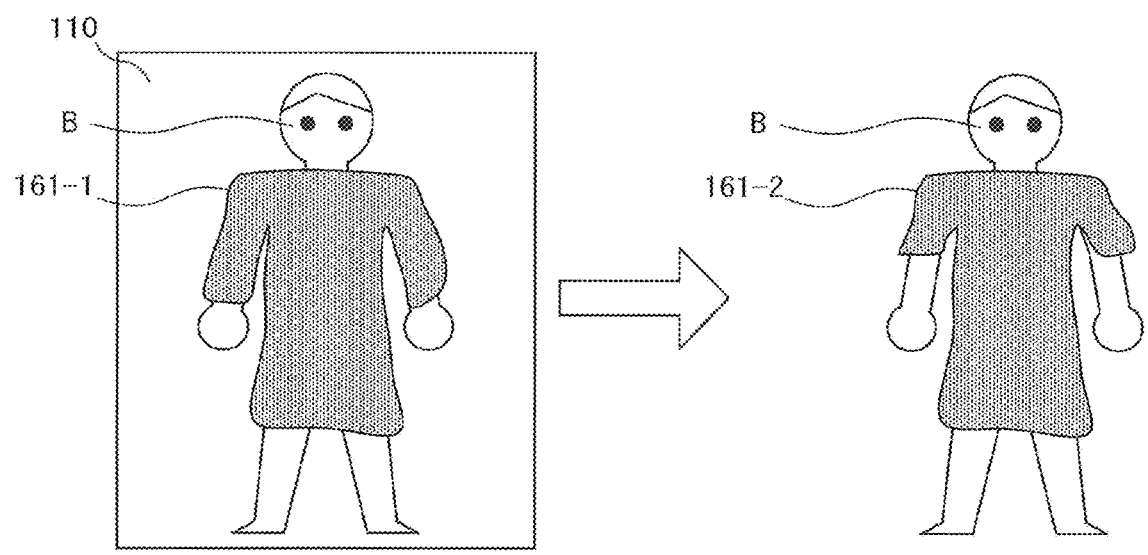
FIG. 18B is a diagram that illustrates an example of a newly drawn specified image and a feature of a shape indicated by a corrected feature value.

FIG. 18A is a diagram that illustrates an example of a specified image and a selected sale image item. As shown in FIG. 18A, the user has drawn a specified image 160 in a specified image drawing page. The specified image 160 generally represents a long-sleeve T-shirt. The search unit 144 searches for sale item images similar to the specified image 160, based on the feature value extracted from the specified image 160. The user selects a sale item image representing a short-sleeve T-shirt from among the found sale item images. In this case, the user may have intended to draw the specified image 160 as an image representing a short-sleeve T-shirt. The feature value extraction unit 142 generates correction information, based on the feature value of the specified image 160 and the feature value of the selected sale item image. FIG. 18B is a diagram that illustrates an example of a newly drawn specified image and a feature of shape indicated by a corrected feature value. After the sale item image is selected, the user newly draws a specified image 161-1. The specified image 161-1 generally represents a long-sleeve dress. However, the user may have intended to draw a short-sleeve dress. The feature value extraction unit 142 corrects the feature value of the specified image 161-1, based on the correction information. At this time, the feature value is corrected so as to indicate a shorter sleeve than the sleeve drawn by the user. The corrected feature value indicates the short-sleeve dress as represented by an image 161-2.

FIG. 19 is a diagram that illustrates one example of contents to be stored in the member DB 12a. The member DB 12a stores correction information in addition to a user ID to credit card information.

[2-2. Operation of Information Processing System]

Figure 20:
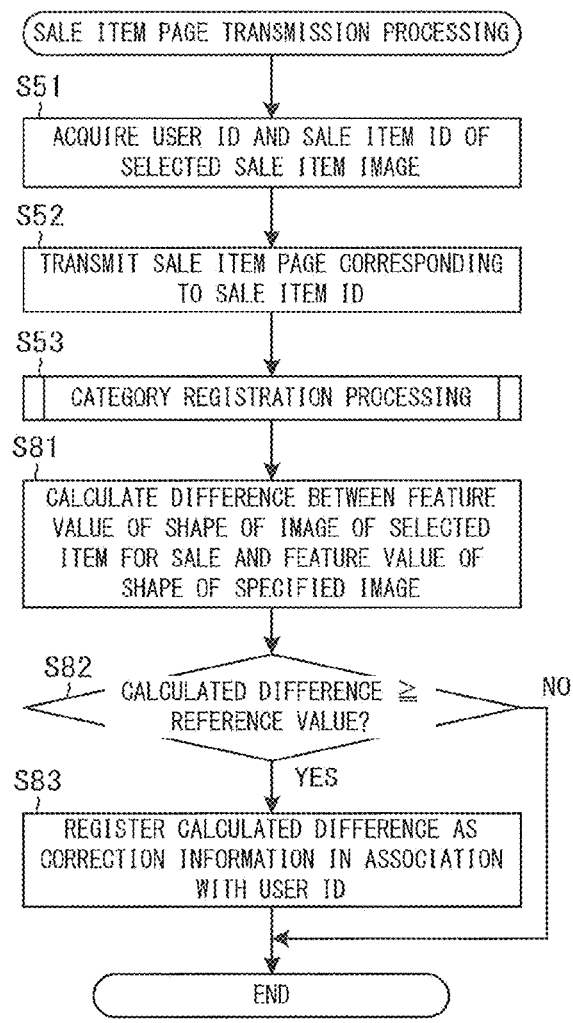
FIG. 20 is a flowchart that illustrates one example of the sale item page transmission processing of the online shopping mall server 1 according to one embodiment.

Next, an operation of the information processing system S will be described with reference to FIGS. 20 and 21. FIG. 20 is a flowchart that illustrates one example of the sale item page transmission processing of the online shopping mall server 1 according to the present embodiment. In FIG. 20, the same steps as those in FIG. 16A are attached with the same signs. As shown in FIG. 20, first, steps S51 to S53 are executed. Next, the feature value extraction unit 142 acquires, from the sale item DB 12e, a feature value of shape of the sale item image selected by the user. The feature value extraction unit 142 calculates a difference between the acquired feature value and the feature value of shape of the specified image (step S81). Next, the feature value extraction unit 142 determines whether or not the calculated difference is not less than a reference value (step S82). At this time, the feature value extraction unit 142, when having determined that the difference is not less than the reference value (YES in step S82), proceeds to step S83. On the other hand, the feature value extraction unit 142, when having determined that the difference is less than the reference value (NO in step S82), terminates the sale item page transmission processing. In step S83, the feature value extraction unit 142 registers the calculated difference, as the correction information, in the member DB 12a in association with the user ID included in the sale item page request. After this step is terminated, the feature value extraction unit 142 terminates the sale item page transmission processing.

FIG. 21 is a flowchart that illustrates one example of the feature acquisition processing of the system control unit 14 of the online shopping mall server 1 according to the present embodiment. In FIG. 21, the same steps as those in FIG. 14B are attached with the same signs. As shown in FIG. 21, first, steps S31 to S35 are executed. Next, the feature value extraction unit 142 determines whether or not the correction information is stored in the sale item DB 12e in association with the user ID included in the image search request (step S91). At this time, the feature value extraction unit 142, when having determined that the correction information is stored (YES in step S91), proceeds to step S92. On the other hand, the feature value extraction unit 142, when having determined that the correction information is not stored (NO in step S91), terminates the feature acquisition processing. In step S92, the feature value extraction unit 142 acquires the correction information corresponding to the user ID from the sale item DB 12e. Then, the feature value extraction unit 142 corrects the feature value of shape extracted from the reference image, based on the acquired correction information, and terminates the feature acquisition processing. In the image search processing shown in FIG. 15, the search unit 144 searches for sale item images similar to the reference image, based on the corrected feature value.

As described above, according to the present embodiment, the system control unit 14 acquires the sale item image drawn by the user, as the specified image. In addition, the system control unit 14, in a case where there is a difference which satisfies a predetermined condition between the feature value of the drawn specified image and the feature value of the selected sale item image, stores correction information indicating contents of correction for reducing the difference in the storage unit 12 in association with the user ID identifying the user who has drawn the specified image. The system control unit 14, in a case where the feature value of the newly drawn specified image is extracted, corrects the extracted feature value with the contents indicated by the correction information corresponding to the user ID identifying the user who has newly drawn the specified image. The system control unit 14 searches for sale item images similar to the new specified image, based on the corrected feature value. Therefore, even if the user cannot draw the sale item image that sufficiently represents a feature of the desired item for sale due to the habit or predisposition, the system control unit 14 can search for an item for sale having a feature that the user desires.

3. Third Embodiment 3-1. Function Summary of System Control Unit]

Figure 23:
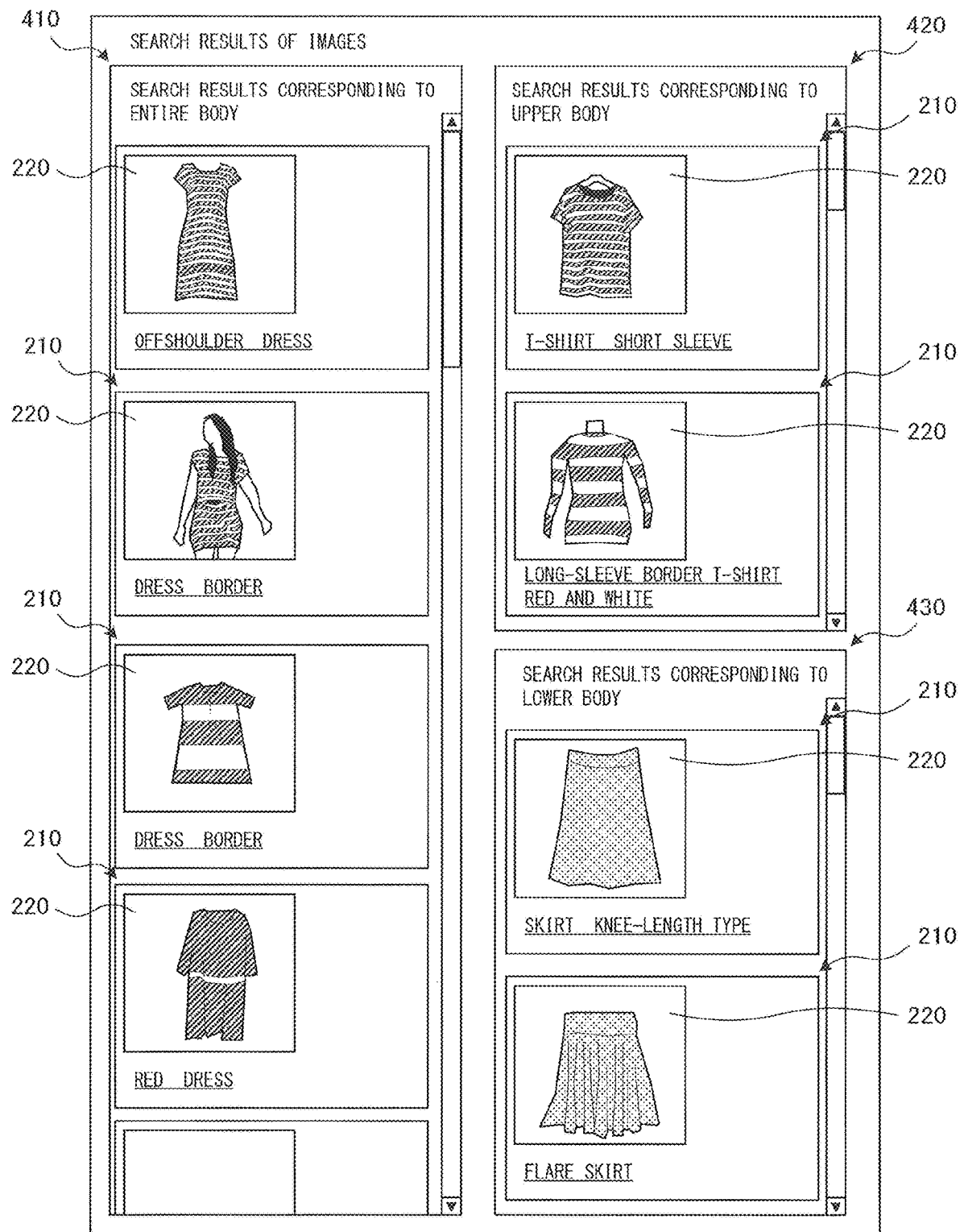
FIG. 23 is a diagram that illustrates one example of a search result page.

Next, a function summary of the system control unit 14 in the third embodiment will be described with reference to FIGS. 22A to 23. The third embodiment is basically the same as the first embodiment or the second embodiment except the points described below. In the first embodiment and the second embodiment, the feature value extraction unit 142 extracts the feature value of the specified image on the assumption that the specified image represents one item for sale. In the present embodiment, the feature value extraction unit 142, in addition to this, in a case where the specified image may represent a plurality of items for sale, extracts feature values of image parts respectively representing the plurality of items for sale in the specified image. In a case where a specified image may represent a plurality of items for sale, the search unit 144 searches for items for sale similar to the specified image, based on the feature value of the specified image, and for image parts respectively representing a plurality of items for sale, searches for sale item images similar to the image parts, based on the feature values of the image parts. The user may have drawn a specified image representing one item for sale, or actually may have drawn a specified image representing a plurality of items for sale. Therefore, the system control unit 14, for each item for sale that the user may have intended to represent by the specified image, searches for sale item images similar to an image representing the item for sale. Thereby, the system control unit 14 can increase the probability of finding a sale item image representing an item for sale that the user desires.

FIG. 22A is one example of a specified image drawn in a drawing area 110 of a specified image drawing page. As shown in FIG. 22A, it is assumed that the user has drawn a specified image 170 on the body image B. In the body image B, the specified image 170 covers, among the body parts P1 to P33, the upper part P4 to lower part P9 of the body, a left shoulder P3, a left upper-arm P4, a right shoulder P16, a right upper-arm P17, a groin P22 of a left thigh to a knee P24, and a groin P28 of a right thigh to a knee P30. Thus, the user may have drawn one dress. However, in the specified image 170, the color and pattern of a part that covers the body parts P4 to P8, P10, P11, P16, and P17 are red and white borders. On the other hand, in the specified image 170, the color and pattern of a part that covers the body parts P9, P22 to P24, and P28 to P30 are pink and solid. Therefore, the user may have drawn a top, such as a T-shirt, and bottoms, such as a mini-skirt.

The feature value extraction unit 142 determines whether or not there is a possibility that the specified image represents a plurality of items for sale. For example, the feature value extraction unit 142 may make a determination, based on which area of the body image the specified image covers, or whether the specified image overlaps at least two areas of a plurality of areas obtained by preliminarily dividing the drawing area 110. For example, the drawing area 110 may be divided into at least two areas of an area including a head, an area including an upper body, an area including a lower body, and an area including a foot. In FIG. 22A, the drawing area 110 is divided into an area 310 including an upper body and an area 320 including a lower body. In a case where the specified image overlaps only one area of the plurality of areas, the feature value extraction unit 142 may determine that the specified image has no possibility of representing a plurality of items for sale. In a case where the specified image overlaps at least two areas, the feature value extraction unit 142 may determine that the specified image may represent a plurality of items for sale. In this case, the feature value extraction unit 142 extracts a feature value from each area that the specified image covers.

The feature value extraction unit 142 may determine whether or not there is a possibility that the specified image represents a plurality of items for sale, based on a change of at least any one of the color and pattern in the body image. For example, the feature value extraction unit 142 searches for a boundary of at least any one of the colors and patterns by analyzing the specified image. In a case where the boundary is not identified from the specified image, the feature value extraction unit 142 may determine that the specified image has no possibility of representing a plurality of items for sale. In a case where the boundary is identified, the feature value extraction unit 142 may determine that the specified image may represent a plurality of items for sale. In this case, the feature value extraction unit 142 divides the specified image into a plurality of images by the identified boundary. Then, the feature value extraction unit 142 extracts the feature value from each of the plurality of images.

The feature value extraction unit 142 may determine that the specified image may represent a plurality of items for sale only in a case where the specified image covers at least two areas of a plurality of areas obtained by dividing the drawing area 110, and at least any one of the colors and patterns of the drawn image are different between at least two areas. FIG. 22B is a diagram that illustrates an example of identifying items for sale that the specified image may represent by using this determination method. As shown in FIG. 22A, the specified image 170 partially overlaps the area 310 and partially overlaps the area 320. In addition, the colors and patterns of the image drawn by the user are different between the areas 310 and 320. Further, the boundary at which the color and pattern change almost coincides with the boundary between the areas 310 and 320. The feature value extraction unit 142 extracts a feature value from the entire specified image 170 on the assumption that the specified image 170 represents one item for sale. In addition, the feature value extraction unit 142 extracts a feature value from a part that covers the area 310 in the specified image 170. In addition, the feature value extraction unit 142 extracts a feature value from a part that covers the area 320 in the specified image 170.

The search unit 144, for each of the specified image and image part the feature values of which have been extracted, searches for sale item images similar to an image representing an item for sale the feature value of which has been extracted. Then, the search unit 144, for each of the specified image and image part the feature values of which have been extracted, causes the user terminal 3 to display, as a search result, at least one of the found sale item images. For example, the search unit 144 may generate a search result page so that the search result may be displayed in separate areas in the search result page. FIG. 23 is a diagram that illustrates one example of the search result page. As shown in FIG. 23, the search result page includes an entire-body correspondence search result area 410, an upper-body correspondence search result area 420, and a lower-body correspondence search result area 430. In the entire-body correspondence search result area 410, sale item images similar to an entire specified image are displayed as the search result. In the upper-body correspondence search result area 420, sale item images similar to an image of the upper body part in the specified image are displayed as the search result. In the lower-body correspondence search result area 430, sale item images similar to an image of the lower body part in the specified image are displayed as the search result. In each of the areas 410 to 430, sale item information display areas 210 including similar sale item images 220 are displayed.

Note that, the search result page may display a tab, list box, or the like with which a user can select any of the entire body, the upper body, and the lower body. The feature value extraction unit 142 may generate the search result page so that any one of the entire-body correspondence search result area 410, upper-body correspondence search result area 420, and lower-body correspondence search result area 430 is displayed according to the selection by the user.

In a case where the specified image may represent a plurality of items for sale, the category acquisition unit 143, on the assumption that the specified image represents one item for sale, acquires a category ID indicating a category corresponding to the item for sale, and acquires a category ID indicating a category corresponding to each of a plurality of items for sale that the specified image may represent.

The category registration unit 145, in a case where a user has selected a sale item image in the search result page, identifies an area including the selected sale item image of the entire-body correspondence search result area 410, upper-body correspondence search result area 420, and lower-body correspondence search result area 430. The category registration unit 145 identifies a category id corresponding to an item for sale represented by a specified image or an image part corresponding to the identified area among the category IDs acquired by the category acquisition unit 143. The category registration unit 145 stores the identified category ID in the sale item DB 12e in association with the sale item ID corresponding to the selected sale item image.

[3-2. Operation of Information Processing System]

Figure 24:
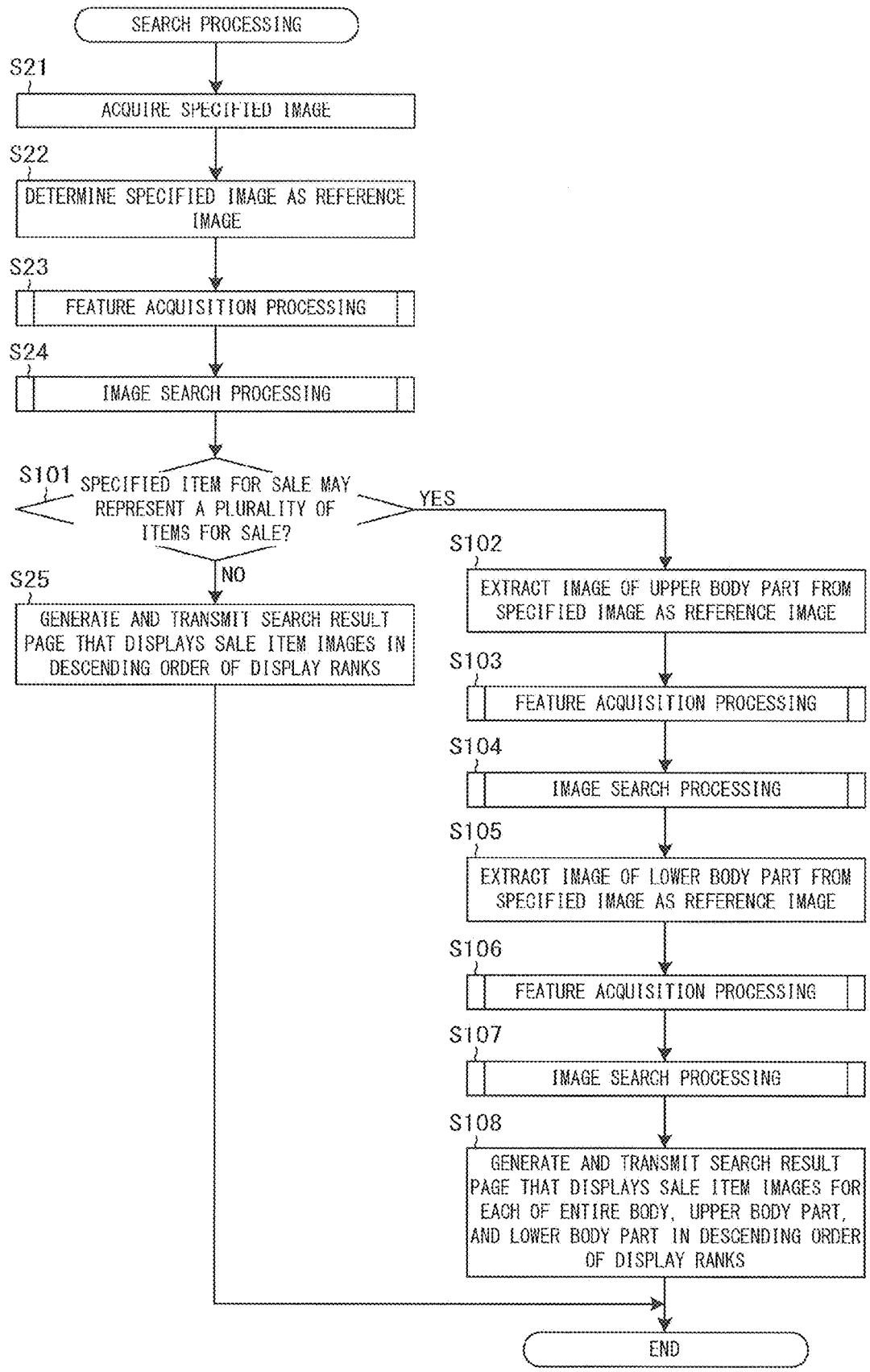
FIG. 24 is a flowchart that illustrates one example of the search processing of the online shopping mall server 1 according to one embodiment.

Next, an operation of the information processing system S will be described with reference to FIG. 24. FIG. 24 is a flowchart that illustrates one example of the search processing of the online shopping mall server 1 according to the present embodiment. In FIG. 24, the same steps as those in FIG. 14A are attached with the same signs. As shown in FIG. 24, first, steps S21 to S24 are executed. On the assumption that the specified image represents one item for sale, extraction of a feature value and acquisition of a category ID are performed (step S23), and sale item images similar to the specified image are searched for (step S24). Next, the feature value extraction unit 142 determines whether or not the specified image may represent a plurality of items for sale (step S101). For example, the feature value extraction unit 142, in a case where the specified image overlaps both of the areas 310 and 320 and at least one of the colors and patterns of the image drawn by the user is different from each other between the areas 310 and 320, determines that the specified image may represent a plurality of items for sale (YES in step s101). In this case, the feature value extraction unit 142 proceeds to step S102. On the other hand, the feature value extraction unit 142, when having determined that there is no possibility that the specified image represents a plurality of items for sale (NO in step S102) proceeds to step S25. In step S25, the search unit 144 generates an HTML document of the search result page and transmits it to the user terminal 3, and terminates the search processing. In this case, the search result page as shown in FIG. 12 is displayed on the display of the user terminal 3.

In step S102, the feature value extraction unit 142 extracts a part overlapping the area 310 from the specified image and determines the extracted part as the reference image. Next, the system control unit 14 executes feature acquisition processing (step S103) and image search processing (step S104). Thereby, based on a part corresponding to the upper body in the specified image, the extraction of a feature value and acquisition of a category ID are performed, and sale item images similar to the part corresponding to the upper body are searched for.

Next, the feature value extraction unit 142 extracts a part overlapping the area 320 from the specified image and determines the extracted part as the reference image (step S105). Next, the system control unit 14 executes feature acquisition processing (step S106) and image search processing (step S107). Thereby, based on a part corresponding to the lower body in the specified image, the extraction of a feature value and acquisition of a category ID are performed, and sale item images similar to the part corresponding to the lower body are searched for.

Next, the search unit 144 generates an HTML document of the search result page (step S108). The search unit 144 generates the HTML document so that the sale item images found in step S24 are displayed in the entire-body correspondence search result area 410, the sale item images found in step S104 are displayed in the upper-body correspondence search result area 420, and the sale item images found in step S107 are displayed in the lower-body correspondence search result area 430. The search unit 144 transmits the generated HTML document to the user terminal 3 and terminates the search processing. In this case, the search result page as shown in FIG. 23 is displayed on the display of the user terminal 3.

As described above, according to the present embodiment, the system control unit 14, on the assumption that the specified image represents one item for sale, extracts a feature value of a sale item image thereof. In addition, the system control unit 14, in a case where the specified image may represent a plurality of items for sale, extracts, for each of the plurality of items for sale, a feature value of an image part representing the item for sale in the specified image. Further, the system control unit 14 searches for sale item images similar to the specified image, based on the feature value of the specified image, and searches, for each image part representing an item for sale, for sale item images similar to the image part, based on the feature value of the image part. In this case, even when the user has drawn a sale item image representing a plurality of items for sale, the system control unit 14 can search for sale item images representing an item for sale that the user is highly likely to desire.

REFERENCE SIGNS LIST

1 online shopping mall server
2 shop terminal
3 user terminal
11 communication unit
12 storage unit
12a member DB
12b shape category DB
12c color category DB
12d pattern category DB
12e sale item DB
13 input/output interface 14 system control unit
14a CPU
14b ROM
14c RAM
15 system bus
141 specified image acquisition unit
142 feature value extraction unit
143 category acquisition unit
144 search unit
145 category registration unit
NW network
S information processing system

The invention claimed is:

1. An information processing device comprising:
at least on memory configured to store computer program code; and
at least one processor configured to read said computer program code and operate as instructed by said computer program code, said computer program code including:
providing code configured to cause at least one of said at least one processor to provide a user interface including a reference image of an object, the user interface receiving a user input drawing, on the reference image, a first image to be used as a search condition for searching an item for sale, the reference image comprising a plurality of feature points of the object having predefined locations on the reference image, respectively;
extraction code configured to cause at least one of said at least one processor to extract a first feature value of the first drawn image;
category information determination code configured to cause at least one of said at least one processor to:
identify which feature points, among the plurality of feature points of the object on the reference image, are overlaid with the first drawn image;
acquire preset cover information of each category among a plurality of categories for classifying items for sale, wherein the preset cover information of a category includes a plurality of cover flags, wherein each cover flag among the plurality of cover flags corresponds to a respective feature point among the plurality of feature points, and each cover flag is set to one of:
a positive indicator indicating that, as a shape of an item for sale in the category is overlaid on the reference image, the corresponding feature point is overlaid by the shape, or
a negative indicator indicating that, as the shape of the item for sale in the category is overlaid on the reference image, the corresponding feature point is not overlaid by the shape;
perform comparing, for each category of the plurality of categories, of the identified feature points that are overlaid with the first drawn image and the plurality of feature points having the corresponding plurality of cover flags set to the positive indicator included in the preset cover information of the category; and
determine category information, indicating a category having a matching degree of a predetermined value or greater based on the comparing, as a category corresponding to an item for sale represented by the first drawn image;
search code configured to cause at least one of said at least one processor to receive the first drawn image as the search condition via the user interface and search for first item images similar to the first drawn image, based on the extracted first feature value and the determined category information, from an item information storage that stores, for each item for sale, sale item identification information identifying an item for sale and an item image representing the item for sale in association with each other;
display control code configured to cause at least one of said at least one processor to cause at least one of the first item images found by the search code to be displayed as at least one search result;
first storage control code configured to cause at least one of said at least one processor to receive a selection of any one item image by the user from the displayed at least one search result, and store the determined category information in the item information storage in association with sale item identification information corresponding to the selected item image;
correction information determination code configured to cause at least one of said at least one processor to calculate correction information based on a value of a difference between the first feature value of the first drawn image and a feature value of the selected item image; and
second storage control code configured to cause at least one of said at least one processor to store the correction information in a correction information storage in association with user identification information for identifying the user,
wherein a second image drawn by the user is received subsequent to the first image, and the extraction code is further configured to cause at least one of said at least one processor to extract a second feature value of the second drawn image,
wherein the computer program code further comprises correction code configured to cause at least one of said at least one processor to correct the extracted second feature value of the second drawn image based on the correction information corresponding to the user identification information identifying the user who has drawn the second image, and
wherein the search code is further configured to cause at least one of said at least one processor to search for second item images similar to the second drawn image, based on the corrected second feature value, from the item information storage.

2. The information processing device according to claim 1, wherein
the display control code is configured to cause at least one of said at least one processor to, based on the selection of the any one item image by the user from the displayed at least one search result, cause at least one item image, among the first item images found, similar to the selected item image to be preferentially displayed based on the feature value of the selected item image.

3. The information processing device according to claim 1, wherein the computer program code further comprises:
body image display control code configured to cause at least one of said at least one processor to cause a body image representing a body to be displayed as the reference image, wherein
the category information determination code is configured to cause at least one of said at least one processor to, based on which part of the body represented by the displayed body image is overlaid with a garment represented by the first drawn image, determine category information indicating a category corresponding to the garment represented by the first drawn image among a plurality of categories for classifying shapes of garments.

4. The information processing device according to claim 1, wherein
the item information storage is configured to, for each item for sale, store category information indicating a category assigned to the item for sale in association with the item image representing the item for sale and the sale item identification information for identifying the item for sale, and
the display control code is configured to cause at least one of said at least one processor to, among the first item images similar to the first drawn image, cause at least one item image corresponding to category information that matches the determined category information to be preferentially displayed.

5. The information processing device according to claim 1, wherein
the item information storage is configured to, for each item for sale, store category information indicating a category assigned to the item for sale in association with the item image representing the item for sale and the sale item identification information identifying the item for sale,
the category information determination code is configured to cause at least one of said at least one processor to, for at least one classification among a plurality of classifications to each of which a plurality of categories belong, determine category information indicating a category corresponding to an item for sale represented by the first drawn image among a plurality of categories belonging to the classification, and
an operation of storing the determined category information in the item information storage by the first storage control code based on the selection of the any one item image by the user from the displayed at least one search result is performed according to a determination that category information indicating a category belonging to the same classification as a classification to which a category indicated by the determined category information belongs is not stored in the item information storage in association with the selected item image.

6. The information processing device according to claim 1, wherein
the item information storage is configured to, for each item for sale, store category information indicating a category assigned to the item for sale in association with the item image representing the item for sale and the sale item identification information identifying the item for sale, and
in an operation of storing the determined category information in the item information storage based on the selection of the any one item image by the user from the displayed at least one search result, the first storage control code is configured to cause at least one of said at least one processor to, based on a determination that category information indicating a category incompatible with a category indicated by the determined category information has been already stored in the item information storage in association with the selected item image, change category information to be stored in the already stored category information to the determined category information.

7. The information processing device according to claim 1, wherein the computer program code further comprises:
determination code configured to cause at least one of said at least one processor to determine whether or not the first drawn image may represent a plurality of items for sale, wherein
the extraction code is configured to cause at least one of said at least one processor to extract the first feature value of the first drawn image on an assumption that the first drawn image represents one item for sale, and based on a determination that the first drawn image may represent the plurality of items for sale, further extract a third feature value of each of a plurality of image parts, in the first drawn image, representing the plurality of items for sale, and
the search code is configured to cause at least one of said at least one processor to, based on the first feature value, search for the first item images similar to the first drawn image, and based on the determination that the first drawn image may represent the plurality of items for sale, further search for third item images similar to each of the plurality of image parts, based on the third feature value.

8. An information processing method executed by a computer, comprising:
providing, by the computer, a user interface including a reference image of an object, the user interface receiving a user input drawing, on the reference image, a first image to be used as a search condition for searching an item for sale, the reference image comprising a plurality of feature points of the object having predefined locations on the reference image, respectively;
extracting, by the computer, a first feature value of the first drawn image;
identifying, by the computer, which feature points, among the plurality of feature points of the object on the reference image, are overlaid with the first drawn image;
acquiring, by the computer, preset cover information of each category among a plurality of categories for classifying items for sale, wherein the preset cover information of a category includes a plurality of cover flags, wherein each cover flag among the plurality of cover flags corresponds to a respective feature point among the plurality of feature points, and each cover flag is set to one of:
a positive indicator indicating that, as a shape of an item for sale in the category is overlaid on the reference image, the corresponding feature point is overlaid by the shape, or
a negative indicator indicating that, as the shape of the item for sale in the category is overlaid on the reference image, the corresponding feature point is not overlaid by the shape;
comparing, by the computer, for each category of the plurality of categories, the identified feature points that are overlaid with the first drawn image to the plurality of feature points having the corresponding plurality of cover flags set to the positive indicator included in the preset cover information of the category;
determining, by the computer, category information, indicating a category having a matching degree of a predetermined value or greater based on the comparing, as a category corresponding to an item for sale represented by the first drawn image;
receiving, by the computer, the first drawn image as the search condition via the user interface and searching for first item images similar to the first drawn image, based on the extracted first feature value and the determined category information, from an item information storage that stores, for each item for sale, sale item identification information for identifying an item for sale and an item image representing the item for sale in association with each other;

causing, by the computer, at least one of the first item images found in the searching to be displayed as at least one search result;

receiving, by the computer, a selection of any one item image by the user from the displayed at least one search result, and storing the determined category information in the item information storage in association with sale item identification information corresponding to the selected item image;

calculating, by the computer, correction information based on a value of a difference between the first feature value of the first drawn image and a feature value of the selected item image; and storing, by the computer, the correction information in a correction information storage in association with user identification information identifying the user;

wherein a second image drawn by the user is received, subsequent to the first image, and a second feature value of the second drawn image is extracted, and wherein the information processing method further comprises:

correcting, by the computer, the extracted second feature value of the second drawn image based on the correction information corresponding to the user identification information identifying the user who has drawn the second image; and searching, by the computer, for second item images similar to the second drawn image, based on the corrected second feature value, from the item information storage.

9. A non-transitory computer readable medium storing thereon an information processing program, the information processing program causing a computer to:

provide a user interface including a reference image of an object, the user interface receiving a user input drawing, on the reference image, a first image to be used as a search condition for searching an item for sale, the reference image comprising a plurality of feature points of the object having predefined locations on the reference image, respectively;

extract a first feature value of the first drawn image;

identify which feature points, among the plurality of feature points of the object on the reference image, are overlaid with the first drawn image;

acquire preset cover information of each category among a plurality of categories for classifying items for sale, wherein the preset cover information of a category includes a plurality of cover flags, wherein each cover flag among the plurality of cover flags corresponds to a respective feature point among the plurality of feature points, and each cover flag is set to one of:

a positive indicator indicating that, as a shape of an item for sale in the category is overlaid on the reference image, the corresponding feature point is overlaid by the shape, or a negative indicator indicating that, as the shape of the item for sale in the category is overlaid on the reference image, the corresponding feature point is not overlaid by the shape;

perform comparing, for each category of the plurality of categories, the identified feature points that are overlaid with the first drawn image to the plurality of feature points having the corresponding plurality of cover flags set to the positive indicator included in the preset cover information of the category;

determine category information, indicating a category having a matching degree of a predetermined value or greater based on the comparing, as a category corresponding to an item for sale represented by the first drawn image;

receive the first drawn image as the search condition via the user interface and search for first item images similar to the first drawn image, based on the extracted first feature value and the determined category information, from an item information storage that stores, for each item for sale, sale item identification information identifying an item for sale and an item image representing the item for sale in association with each other;

cause at least one of the first item images found by the search to be displayed as at least one search result;

receive a selection of any one item image by the user from the displayed at least one search result, and store the determined category information in the item information storage in association with sale item identification information corresponding to the selected item image;

calculate correction information based on a value of a difference between the first feature value of the first drawn image and a feature value of the selected item image; and store the correction information in a correction information storage in association with user identification information identifying the user;

wherein a second image drawn by the user is received, subsequent to the first image, and a second feature value of the second drawn image is extracted, and wherein the information processing program further cause the computer to:

correct the extracted second feature value of the second drawn image based on the correction information corresponding to the user identification information for identifying the user who has drawn the second image; and search for second item images similar to the second drawn image, based on the corrected second feature value, from the item information storage.

10. The information processing device according to claim 1, wherein the reference image is a body image representing a human body, and wherein the preset cover information of a category of a garment includes body cover information, which is information indicating an area on the human body represented by the reference image, that the garment of the category covers when a shape of the garment is applied to the reference image.

11. The information processing device according to claim 10, wherein the body cover information includes, for each body part, a body part identifier and a cover flag, among the plurality of cover flags, in association with each other, wherein the cover flag in association with the body part identifier indicates whether or not a body part indicated by the body part identifier is covered with the garment.

* * * * *